(12) United States Patent
Demarco

(10) Patent No.: US 12,379,318 B2
(45) Date of Patent: Aug. 5, 2025

(54) KINEMATICS PATH METHOD FOR LASER-INDUCED BREAKDOWN SPECTROSCOPY

(71) Applicant: THERMO FISHER SCIENTIFIC (ECUBLENS) SAR, Ecublens (CH)

(72) Inventor: Fabio Demarco, Ecublens (CH)

(73) Assignee: Thermo Fisher Scientific (Ecublens) SARL, Ecublens (CH)

( * ) Notice: Subject to any disclaimer, the term of this patent is extended or adjusted under 35 U.S.C. 154(b) by 63 days.

(21) Appl. No.: 18/026,181

(22) PCT Filed: Aug. 3, 2021

(86) PCT No.: PCT/EP2021/071640
§ 371 (c)(1),
(2) Date: Mar. 14, 2023

(87) PCT Pub. No.: WO2022/053228
PCT Pub. Date: Mar. 17, 2022

(65) Prior Publication Data
US 2023/0358684 A1    Nov. 9, 2023

(30) Foreign Application Priority Data

Sep. 14, 2020 (GB) ..................................... 2014417

(51) Int. Cl.
*G01N 21/71* (2006.01)
*G01J 3/443* (2006.01)

(52) U.S. Cl.
CPC ............ *G01N 21/718* (2013.01); *G01J 3/443* (2013.01); *G01N 2201/06113* (2013.01)

(58) Field of Classification Search
CPC ....... G01N 21/718; G01N 2201/06113; G01N 1/04; G01N 2001/045; G01J 3/443
See application file for complete search history.

(56) References Cited

U.S. PATENT DOCUMENTS

2004/0217270 A1* 11/2004 Publicover ......... G02B 21/0024
                                                        250/234
2014/0268133 A1*  9/2014 McManus ................. G01J 3/28
                                                        356/316
(Continued)

FOREIGN PATENT DOCUMENTS

JP         2000098238 A  *  4/2000
JP         2006520022 A     8/2006
(Continued)

OTHER PUBLICATIONS

English Translation of Yuko JP2000-098238A Description (Year: 2000).*

(Continued)

*Primary Examiner* — Tarifur R Chowdhury
*Assistant Examiner* — Akbar H. Rizvi

(57) ABSTRACT

A method for compositional analysis includes providing a sample having a surface and determining with a controller a plurality of equidistant positions along an oscillatory path along the surface. The oscillatory path is sinusoid in at least one orthogonal dimension within a plane approximately parallel to the surface. The method further includes, for each equidistant position of the plurality of equidistant position, moving an ablation point along the oscillatory path to the each equidistant position, pulsing an energy source to provide an electromagnetic energy beam to ablate material at the ablation point, and collecting an emission spectrum with a spectrographic instrument in response to pulsing the energy source. The method also includes analyzing the emission spectrum to determine a composition at the surface.

20 Claims, 15 Drawing Sheets

(56) References Cited

U.S. PATENT DOCUMENTS

| | | | |
|---|---|---|---|
| 2017/0167982 A1* | 6/2017 | Doucet | G01N 21/718 |
| 2017/0247797 A1* | 8/2017 | Zhou | F01D 5/005 |
| 2018/0045570 A1* | 2/2018 | Smith | G01J 3/06 |
| 2019/0271652 A1 | 9/2019 | Zhao et al. | |

FOREIGN PATENT DOCUMENTS

| | | |
|---|---|---|
| JP | 2018516356 A | 6/2018 |
| WO | WO-2013031824 A1 | 3/2013 |
| WO | WO-2015077867 A1 | 6/2015 |
| WO | WO-2017006233 A1 | 1/2017 |
| WO | WO-2017037680 A1 | 3/2017 |

OTHER PUBLICATIONS

PCT/EP2021/071640, International Search Report and Written Opinion, Oct. 21, 2021, 13 Pages.

\* cited by examiner

KINEMATICS PATH METHOD FOR LASER-INDUCED BREAKDOWN SPECTROSCOPY

CROSS-REFERENCE TO RELATED APPLICATIONS

This application is a U.S. 371 of International Application No. PCT/EP2021/071640 filed Aug. 3, 2021, which claims priority to United Kingdom Application No. GB2014417.6 filed Sep. 14, 2020, which disclosures are herein incorporated by reference in their entirety.

FIELD OF THE DISCLOSURE

This disclosure in general relates to systems and methods for performing laser-induced breakdown spectroscopy.

BACKGROUND

Elemental analysis techniques aid in determining the elemental composition of a material in various forms. Elemental analysis techniques range from destructive (e.g., material is destroyed in testing) to semi-destructive (e.g., material is sampled or surface damaged) to fully non-destructive (e.g., material is left fully intact). Example techniques can include Inductively Coupled Plasma-Atomic Emission Spectroscopy (e.g. ICP-AES), ICP-Mass Spectrometry (e.g. ICP-MS), Electrothermal Atomization Atomic Absorption Spectroscopy (e.g. ETA-AAS), X-Ray Fluorescence Spectroscopy (e.g. XRF), X-Ray Diffraction (e.g. XRD), and Laser-induced Breakdown Spectroscopy (e.g. LIBS). Elemental analysis may be either qualitative or quantitative and often requires calibration to known standards.

Laser-induced breakdown spectroscopy (LIBS) is an analytical technique used to analyze a large variety of materials, including metals, polymers, glasses, ceramics, and minerals. LIBS can very accurately detect and quantify elements of the periodic table. It can perform analysis of large and small samples, requires little-to-no sample preparation, and can be used for both bulk elemental analysis and microscanning for imaging. LIBS relies on pulsed energy emissions, such as pulsed laser emission, directed toward the sample to ablate, atomize, and ionize matter. The impact of each laser pulse onto the sample's surface creates a plume of plasma, light from which can be analyzed to perform qualitative or quantitative spectroscopy measurements. LIBS can therefore provide an easy to use, rapid, and in-situ chemical analysis with high precision, detection limits, and low cost.

Laser interactions with matter are governed by quantum mechanics which describe how photons are absorbed or emitted by atoms. If an atom absorbs a photon, one or more electrons move from a ground state to a higher energy quantum state. Electrons tend to occupy the lowest possible energy levels, and in the cooling/decay process the atom emits a photon to return to a lower energy level. The different energy levels of different atoms produce different photon energies for each kind of atom, with narrowband emissions due to their quantization. These emissions correspond to the spectral emission lines found in LIBS spectra.

There are three basic stages in the plasma lifetime. The first stage is the ignition process which includes the initial bond breaking and plasma formation during the laser pulse. This ignition process is affected by the laser type, laser power, and pulse duration. The second stage in plasma life is the most critical for optimization of LIBS spectral acquisition and measurement because the plasma causes atomic emission during the cooling process. After ignition, the plasma will continue expanding and cooling. At the same time, the electron temperature and density will change. This process depends on ablated mass, spot size, energy coupled to the sample, and environmental conditions (state of the sample, pressure, etc.).

The last stage of the plasma life is less useful for LIBS measurements. A quantity of ablated mass is not excited as vapor or plasma; hence this material is ablated as particles and these particles create condensed vapor, liquid sample ejection, and solid sample exfoliation, which do not emit radiation. Moreover, ablated atoms become cold and create nanoparticles in the recombination process of plasma.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DETAILED DESCRIPTION

In an embodiment, a system for compositional analysis includes an energy source to provide an energy beam directed at an ablation point on a surface of a sample. The energy source can, for example, be a laser. The ablation point can be moved to positions (sample points) on the surface sequentially along an oscillatory path. In an example, the positions can be disposed at equidistance locations along the oscillatory path. In an example, the oscillatory path includes a sinusoidal pattern in at least one orthogonal dimension of the planar dimensions. The system can include a controller that directs the movement of the ablation point to the positions along the oscillatory path. The system can further include lenses and mirrors, or optionally, linear stage platforms to facilitate movement of the ablation point. The energy beam ablates material from the surface of the sample at the ablation point. The ablated material evolves an emission spectrum. The system can include a collection system to collect the emission spectrum. In an example, the collection system includes a collection lens optically connected to a spectral analyzer or spectrograph to determine the wavelengths emitted by the ablated material. The system can use the emission spectrum to determine which elements are present and optionally, in what quantities.

In a further example, a method for compositional analysis includes providing a sample having a surface. At each position (sample point) sequentially along an oscillatory path, material is ablated from the surface at the position, an emission spectrum is collected, and the emission spectrum is analyzed to determine a composition at the surface. Optionally, the emission spectrum is converted to a digital signal for further analysis to determine composition. The compositions can be analyzed, such as through averaging, to determine an average surface composition. In another example, compositions at positions can be used to form an image or map of positionally-resolved compositions.

It has been discovered that conventional scanning methods, particularly when used with irregular shapes, fail to provide quick and distributed coverage of a surface. When averaging composition over a surface, conventional methods tend to over emphasize one region of the surface relative to another region. The systems and methods described herein advantageously provide for uniform coverage and speed of testing, among other benefits.

Figure 1:
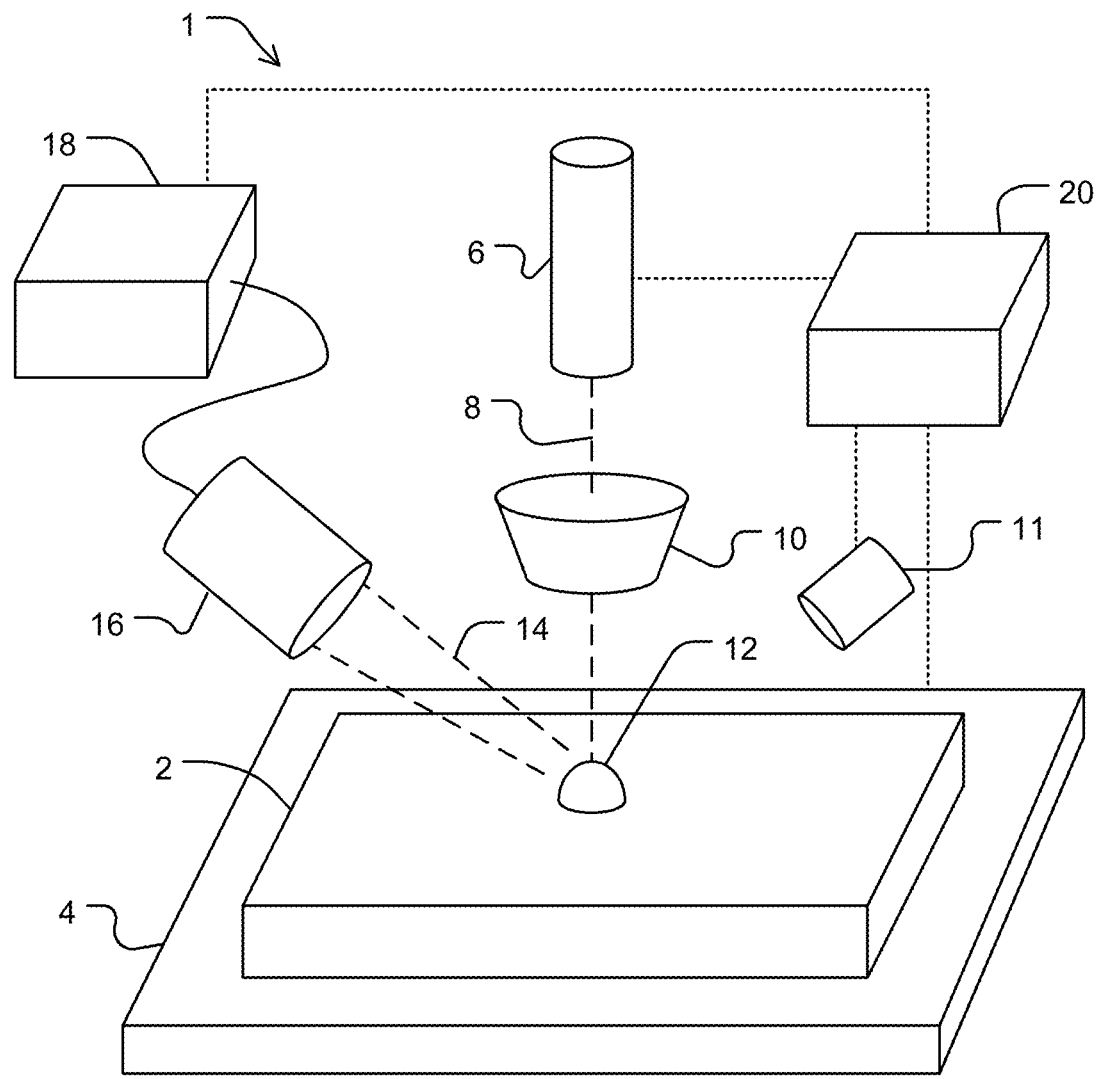
FIG. 1 includes an illustration of an example laser-induced breakdown spectroscopy system.

FIG. 1 includes a schematic illustration of a system 1 for performing compositional analysis, for example, through laser-induced breakdown spectroscopy. A sample 2 is placed on a platform 4. An energy source 6 directs an energy beam 8 through optical systems, such as lenses 10, at an ablation point 12 positioned on the surface of the sample 2. Material is ablated from the surface of the sample 2 and at least a portion of the ablated material is atomized or ionized, resulting in an emission spectrum 14 that is collected by a collection lens 16 optically connected to a spectrometer 18, for example, using a fiber-optic cable.

The energy source 6 can be a laser. In an example, the energy source 6 is a pulsed laser having a wavelength in a range of 200 nm to 1100 nm, such as 1064 nm, 532 nm, or 266 nm. Further, the energy source 6 can have a peak power in a range of 0.5 MW/cm$^2$ to 2 GW/cm$^2$, such as at least 1 MW/cm$^2$, sufficient for ablating material from a surface of a sample and to probe elemental composition. For example, the laser pulses can have an energy in a range of 100 µJ-100 mJ and a pulse width in the femtosecond, picosecond, or nanosecond regime with a pulse repetition rate of up to the MHz regime. The laser may be a mode-locked or Q-switched laser. For example, the laser may be a passive Q-switched or an active Q-switched laser.

Lens 10 can include a spherical lens, a flat-field scanning lens, e.g., an F-tan(θ) scanning lens, or an F-Theta scanning lens. In particular, the lens 10 is an F-Theta scanning lens.

The collection system can include the collection lens 16 and a spectrometer 18. In an example, spectrometer includes an imaging apparatus, such as a charge coupled device (CCD) imaging apparatus. In a further example, the emission spectrum can be directed by one or more mirrors to the spectrometer. In an additional example, the spectrometer can include various optical components such as one or more mirrors, lenses, apertures, gratings, prisms, and emission collection apparatuses. In an example, the emission collection apparatus is a charge coupled device (CCD) apparatus. But in other examples, other emission detectors can be employed.

In particular, the system 1 includes a controller 20. In an example, the controller 20 can control the relative movement of the ablation point 12 to positions on the surface of the sample 2. For example, the controller 20 can control a linear stage translation table, such as platform 4, to move the sample 2 relative to a fixed beam 8. In another example, mirrors such as galvo mirrors, prisms, or lenses can be used to alter the relative position of the ablation point on a fixed sample. The controller 20 can control the relative movement of the ablation point 12 to positions on the surface of the sample 2 sequentially along an oscillatory path. From the collection of the emission spectrum at each position on the surface of the sample 2, it is possible to construct a compositional map of the scanned surface.

The controller 20 can further control the timing of the laser 6 to ablate material only at the desired positions on the sample surface. Further, the controller 20 can control the collection system, such as the spectrometer 18, to collect the emission spectrum at a time delayed from the activation of the laser 6.

In an example, the controller 20 can further allow for the selection of a test area on the surface of the sample 2. For example, the controller 20 can use the laser system to detect edges of the surface and select the full surface area. In another example, the controller 20 can use an optional camera 11 to detect edges of the surface. In a further example, the controller 20 can provide an interface to a user that permits the user to select an area of the surface for testing.

As an alternative to a translation table, the system can include a set of one or more fixed mirrors and movable positioning mirrors, such as galvo mirrors, and can direct an electromagnetic energy beam through a lens to an ablation point on the surface of the sample. In an example, the mirrors, which are motor driven, can be controlled and adjusted automatically to guide the ablation point to positions (sample points) disposed sequentially along the oscillatory path on the surface of the sample 2. In an example, the controller 20 controls the adjustable mirrors to adjust the position (sample points) on the surface of the sample 2 at which the ablation point 12 is located. In particular, the controller 20 is configured to move the ablation point to positions disposed sequentially along the oscillatory path, for example by controlling motors that drive the adjustable mirrors.

The controller 20 can comprise a computer (not shown): for example, comprising a storage medium, a memory, a processor, one or more interfaces, such as a user output interface, a user input interface and a network interface, which are linked together. The storage medium may be any form of non-volatile data storage device such as one or more of a hard disk drive, a magnetic disc, an optical disc, a ROM, etc. The storage medium may store one or more computer programs for causing the controller 20 to adjust the position on the surface of the sample 2 at which the ablation point 12 is located. The memory may be any random access memory suitable for storing data or computer programs. The processor may be any processing unit suitable for executing one or more computer programs (such as those stored on the storage medium or in the memory). The processor may comprise a single processing unit or multiple processing units operating in parallel, separately or in cooperation with each other. The processor, in carrying out processing operations, may store data to or read data from the storage medium or the memory. An interface may be provided that is any unit for providing an interface between the computer and the movable mirrors or translation platform 4 and the energy source 6. A user input interface may be arranged to receive input from a user or operator. The user may provide this input via one or more input devices of the controller, such as a mouse (or other pointing device) or a keyboard, that are connected to, or in communication with, the user input interface. However, it will be appreciated that the user may provide input to the computer via one or more additional or alternative input devices (such as a touch screen). The computer may store the input received from the input devices via the user input interface in the memory for the processor to subsequently access and process, or may pass it straight to the processor, so that the processor can respond to the user input accordingly. A user output interface may be arranged to provide a graphical/visual output to a user or operator. For example, the emission spectrum collected from the sample may be provided as a graphical/visual output to a user or operator. As such, the processor may be arranged to instruct the user output interface to form an image/video signal representing a desired graphical output, and to provide this signal to a video display unit (VDU) such as a monitor (or screen or display unit) that is connected to the user output interface. It will be appreciated that the computer architecture described above is merely exemplary and that other computer systems with different architectures (for example with fewer components or with additional or alternative components) may be used. As examples, the computer could comprise one or more of: a personal computer; a server computer; a laptop; etc.

Figure 2:
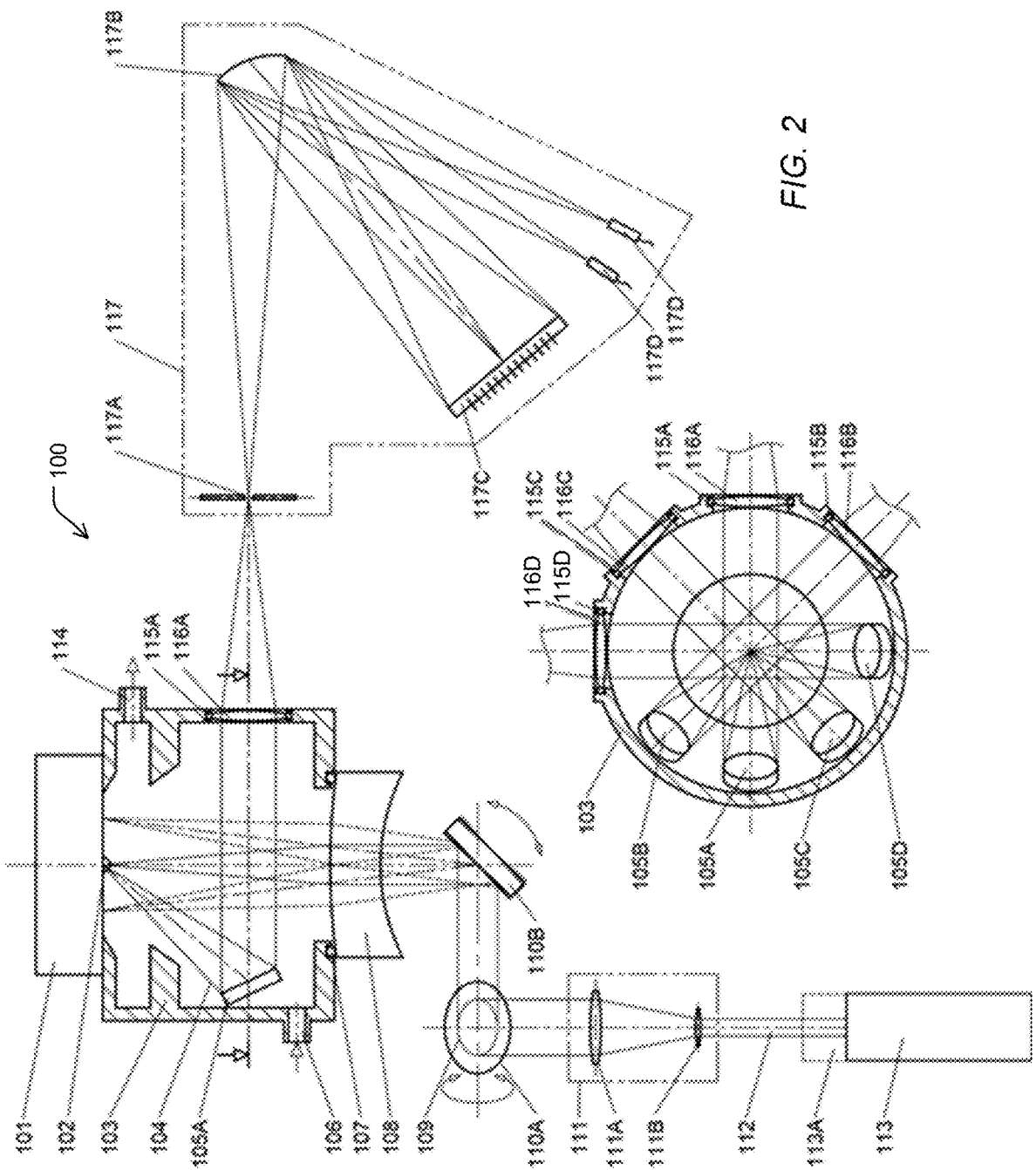
FIG. 2 includes an illustration of an example laser-induced breakdown spectroscopy system.

FIG. 2 includes an illustration of a laser-induced breakdown spectroscopy (LIBS) system 100 that includes a pulsed laser 113, a beam expander 111, a dual-axis scanning galvo system 110, a lens 108, a chamber 103, one or more mirrors 105, associated lenses 116, and one or more spectrographs 117. A sample 101 can be positioned on a table including an opening or analysis aperture to expose a surface of the sample to an interior of the chamber 103.

The laser source 113 emits light pulses 112, for example, having the wavelength or power as described above in relation to FIG. 1. The laser source 113 can have pulse rates in a range of 1 to 1000 Hz. Each pulse 112 is directed onto the surface of the sample 101, where a plasma 102 is generated. Light emanating from the plasma 102 may be collected by mirrors 105 and directed through lenses 116 to spectrographs 117. The corresponding detection of light intensity can be used to perform qualitative or quantitative spectroscopy, leading to the identification of elements on the surface and potentially composition.

Optionally, a beam expander 111 is disposed in the path of the laser beam 112 from the laser source 113 to increase the diameter of the laser beam 112. Expanding the diameter of the laser beam 112 decreases the power per unit area, avoiding damaging optical components such as mirrors of the galvo system 110, and subsequently achieves tighter focusing spots on the sample surface. Thus, the beam 112 when striking the mirrors 110 reflects off a larger area 109. In an example, the beam expander 111 includes an entry lens 111B and an exit lens 111A.

The galvo system 110 can include two motorized mirrors 110A and 110B. Such motorized mirrors 110A and 110B coupled with a lens 108, such as an F-theta lens, can direct a beam that follows a mapping on the surface of the sample 101. In an example, the lens 108 can focus the laser beam 112 to a spot of approximately 10 μm on the sample surface. The laser intensity per unit area on the spot is sufficient to generate a plasma 102. Part of the light 104 emitted by the plasma 102 is recovered by one or more mirrors 105A, 105B, 105C, or 105D and focused through one or more lenses 116A, 116B, 116C, or 116D on one or more spectrographs 117. Although four mirrors 105A, 105B, 105C and 105D and four corresponding lenses 116A, 116B, 116C and 116D are shown, it will be appreciated that embodiments can be provided with one or more such mirrors and one or more corresponding lenses.

The spectrograph 117 splits the light 104 according to the wavelength using a slit 117A and a grating 117B, and detects the lights using a linear array sensor 117C or single channel sensors 117D. The sensor signals from the sensors 117C or 117D can be used to determine the elemental composition of the sample.

The sample 101 is coupled with the chamber 103 to permit a surface of the sample 101 to be exposed to an interior of the chamber 103. The chamber 103 can otherwise be hermetically sealed. For example, lenses 108 or 116 can include o-rings 107 or 115.

The chamber 103 can be flushed using a gas such as argon, nitrogen, helium, or air. The interior of the chamber 103 can be maintained at pressure or vacuum. The gas can be injected through an opening 106 into the chamber 103 and exit through a second opening 114 from the chamber 103. Optionally, a vacuum pump can be connected to the second opening 114, drawing a vacuum in the chamber 103 as the gas moves through the chamber 103. The location of the openings 106 or 114 can provide for gas flow across the chamber to reduce dead volumes and evacuate dust generated by the plasma 102. When a vacuum pump is connected to the second opening 114, dust can be evacuated through the vacuum pump. In particular, the quality and the nature of the plasma 102 and the resulting emitted light 104 depends on the environment within the chamber 103. As such, a hermetic chamber 103 with dust management is highly desirable.

Figure 3:
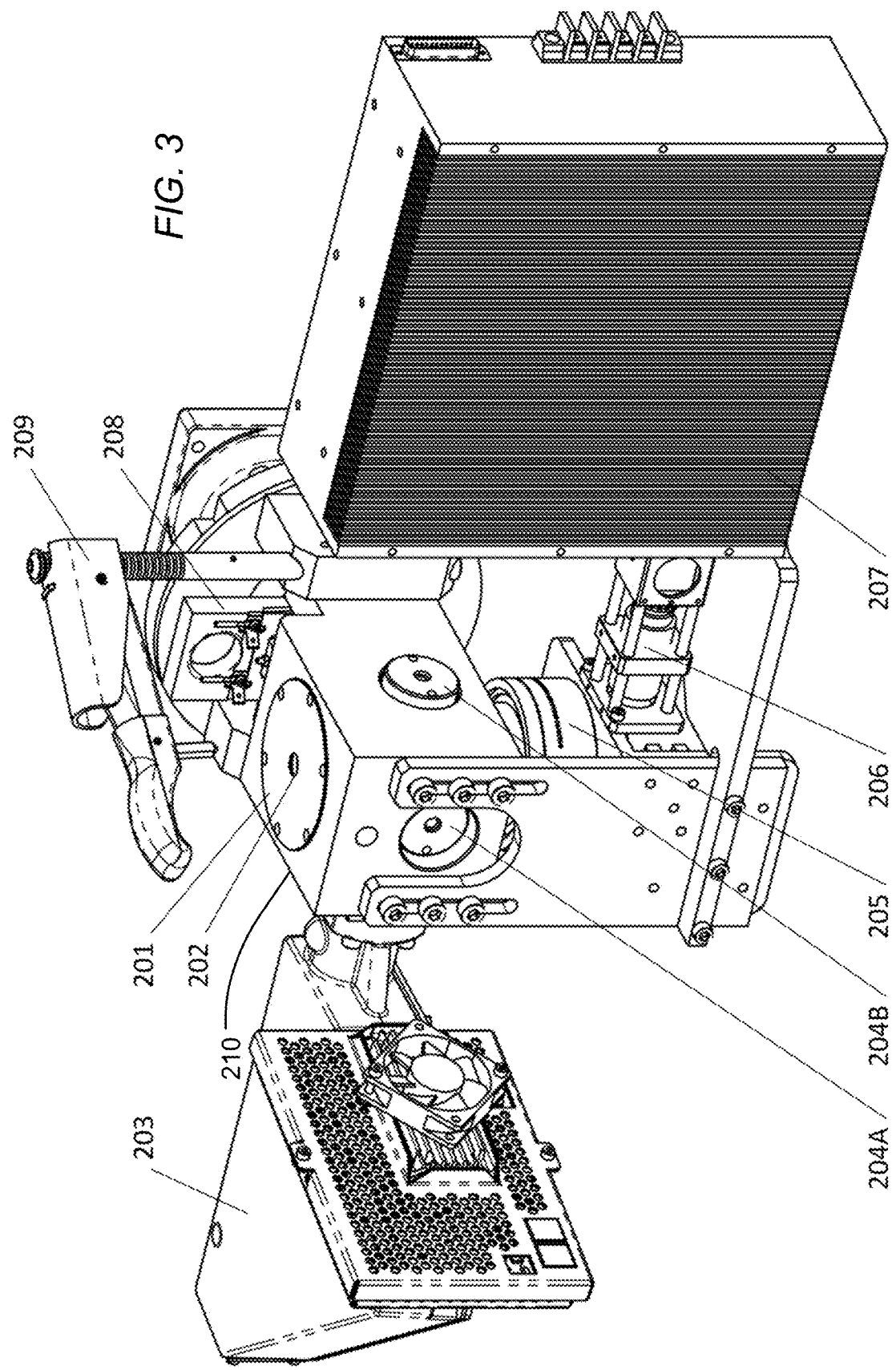
FIG. 3 and FIG. 4 include illustrations of an example apparatuses for performing laser-induced breakdown spectroscopy.

As illustrated in the example LIBS system of FIG. 3, a sample table 201 having an analysis aperture 202 sits above a chamber 210. The sample can be held in place by a sample press 209. A laser system 207 is coupled through a beam expander 206 via a galvo mirror system to lens 205 that directs laser pulses to a surface of a sample exposed through the analysis aperture 202.

Light emitting from a plasma generated as a result of the laser pulse impinging on the surface of the sample through the analysis aperture 202 can be collected by mirrors held by the plasma vision mirror supports 204A and 204B. In an example, light collected by a mirror coupled to the plasma vision mirror support 204A is directed to the spectrographic lens 208. In another example, light collected by a mirror attached to plasma vision mirror support 204B is projected to a spectrograph 203.

Figure 4:
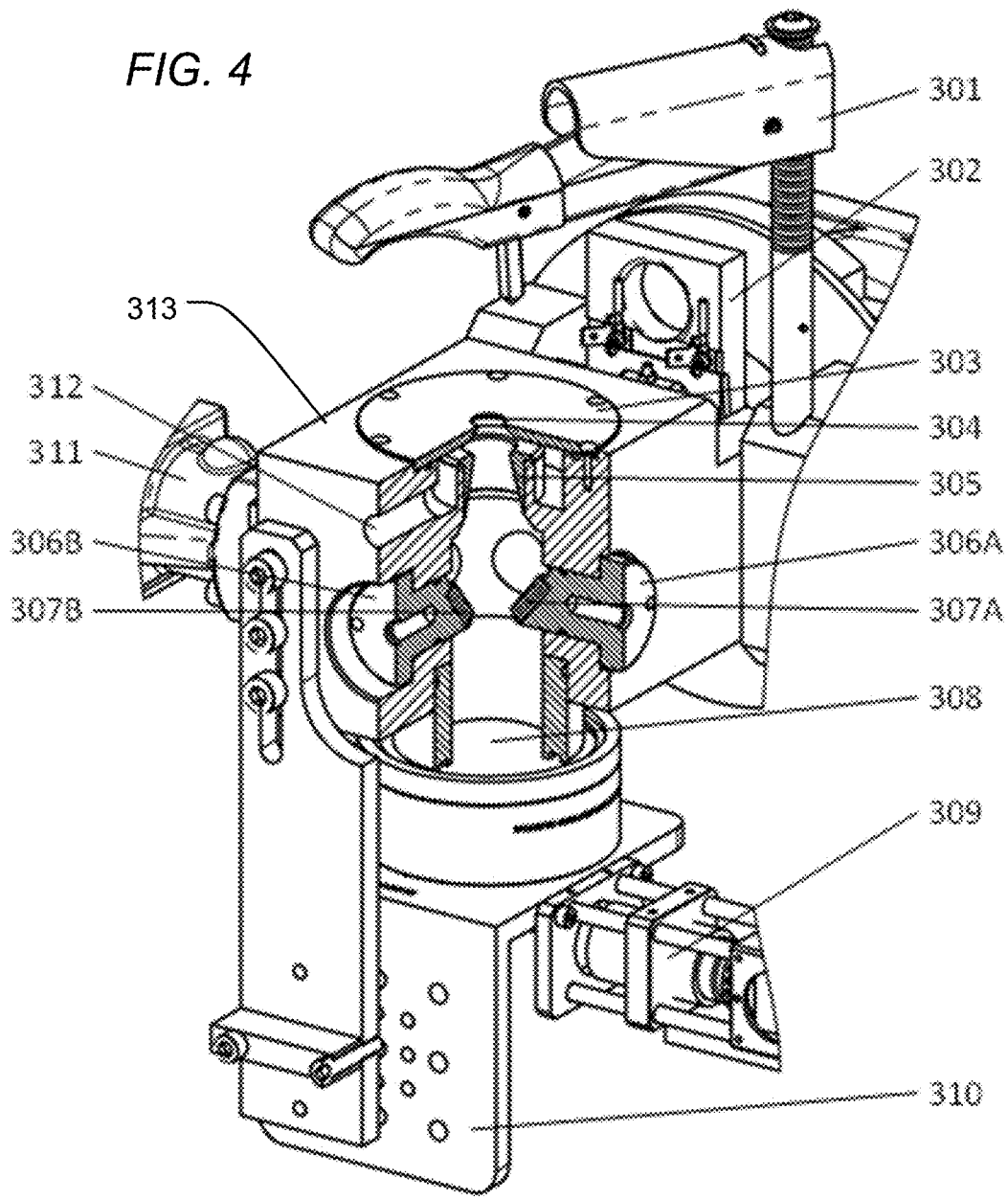

FIG. 4 further illustrates details relating to the LIBS system of FIG. 1. A sample press 301 can secure a sample to a sample table 303 having an analysis aperture 304 open to an interior of the chamber 313. Laser pulses directed through the beam expander 309 and the F-theta lens 308 can impinge on the sample through the analysis aperture 304. The F-theta lens 308 can be supported by an F-theta lens support 310. Using a galvo mirror system, such as those illustrated in FIG. 2, laser pulses passing through the beam expander 309 and the F-theta lens 308 can be mapped onto the surface of the sample exposed through the analysis aperture 304.

Light emitted from the resulting plasma can be collected by mirrors 307A or 307B and can be directed through spectrograph lens 302 or to a spectrograph 311. For example, light collected by the mirror 307A can be redirected to the spectrograph 311. In another example, light collected by the mirror 307B can be directed to the spectrographic lens 302. The mirrors 307A or 307B can be held in place by the plasma vision mirror supports 306A or 306B, respectively.

In a further example, the chamber 313 can be configured for gas flow to draw dust particles generated by the plasma away from the sample surface and the sample aperture 304. For example, the chamber 313 may have a gas inlet (not illustrated) disposed proximal to a bottom of the chamber near the lens 308. Gas can flow up through the chamber 313 toward the analysis aperture 304. The chamber 313 can define a flow pipe 305 or wall. Gas flows over the wall into an annulus connected to an outlet 312. Optionally, the outlet 312 can be connected to a vacuum pump drawing gas through the chamber 313, over the flow pipe 305, into the annulus, and out of the outlet 312.

Figure 5:
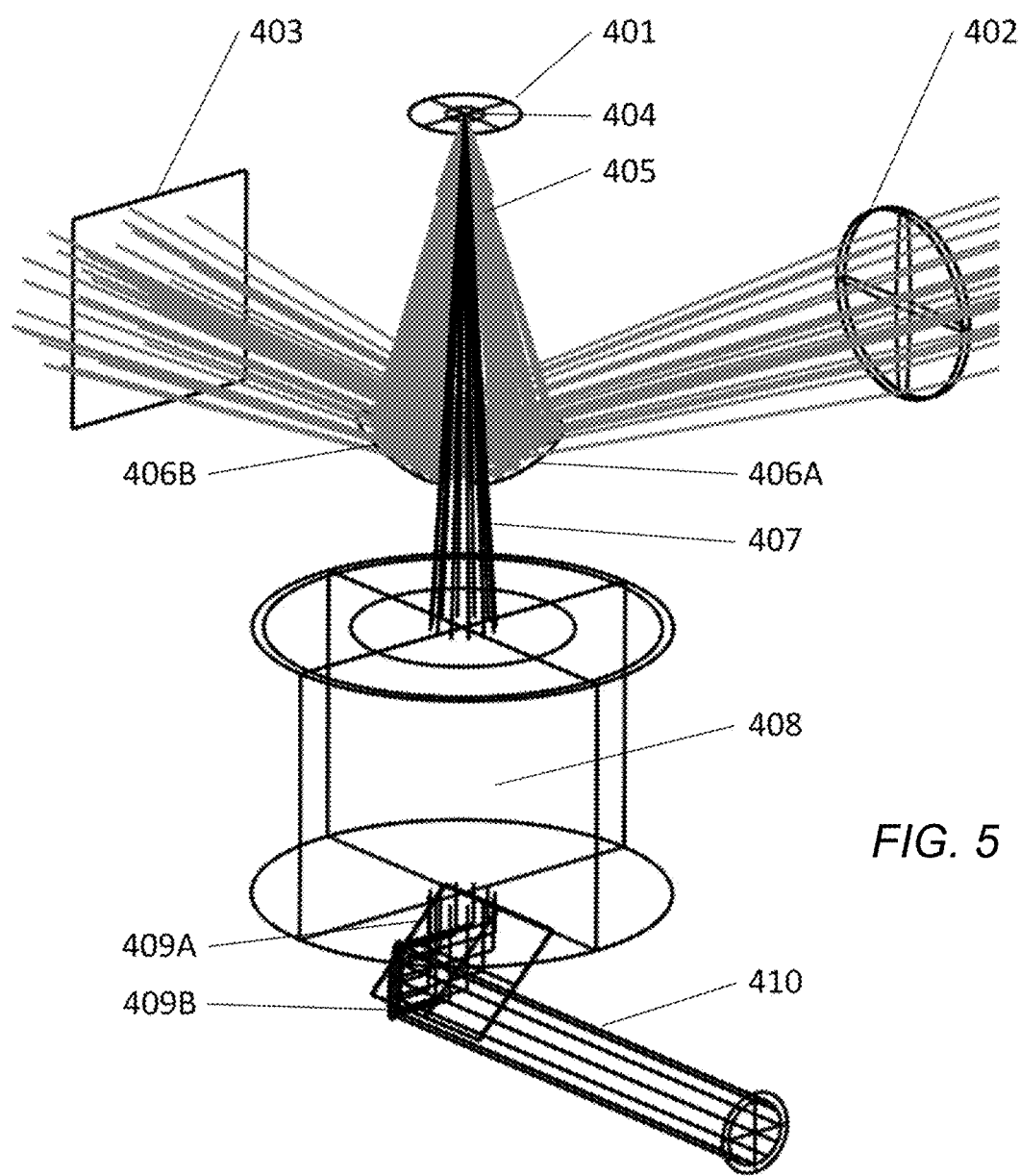
FIG. 5 includes a beam diagram for an example laser-induced breakdown spectroscopy system.

FIG. 5 illustrates example paths of light extending through the system. For example, a laser beam 410 can be directed to motorized mirrors 409A or 409B of a galvo system and through an F-theta lens 408 that provides a focused laser beam onto a sample plane 401. Upon impinging a sample at the sample plane 401, the laser beam generates a plasma 404 that emits light 405. The light 405 of the plasma 404 can impinge mirrors 406A or 406B that direct the collected light 405 onto a spectrographic lens 402 or into a spectrograph through entrance 403. In an example, the spectrograph, such as the spectrograph illustrated in FIG. 1, FIG. 2, or FIG. 3 can collect the spectrum emitted by the plasma and determine elemental composition based on the spectrum.

Each of the systems illustrated in FIG. 2, FIG. 3, FIG. 4, and FIG. 5 can include the elements and features of each other or of the system illustrated in FIG. 1. In an example, each of the systems of FIG. 2, FIG. 3, FIG. 4, and FIG. 5 can further include controllers having the form and functionality described in relation to FIG. 1. In a further example, each of the systems of FIG. 2, FIG. 3, FIG. 4, and FIG. 5 can have a camera as described in relation to FIG. 1.

A feature of the system, such as those illustrated in FIGS. 1-5, is the oscillatory scanning over the surface of a sample for bulk elemental analysis. In an example, the oscillatory scanning allows for averaging over a large number of sample points to obtain desirable statistics after each measurement. Collection of many sample points over the sample surface under consideration increases the accuracy of the qualitative or quantitative analysis. Collecting measurements from many sample points across the surface is more representative of sample composition compared to a single point. For example, the system can analyze a surface area of 1 mm to 10 mm in diameter, compared to a single point of about 10 μm in diameter.

Without the scanning of the systems described above, the laser would ablate the same portion of the sample at each pulse and, after each pulse, composition of the sample would be analyzed at different depths. Such a measurement technique is limited, as there exists a depth limit after which no further analysis is possible. For example, the plasma digs into a crater to the point that the plasma is shielded by the depth of the crater or the focus of the laser is no longer sufficient to create a reliable plasma. In contrast, the scanning of the present systems increase the number of measurements, while continually detecting the plasma at the focal point of the F-theta lens.

For accurate and representative analysis of the sample surface, it is desirable to have distributed sampling across the surface, for example, using a scanning path that provides distributed sampling of the surface and improved mirror movement with reduced acceleration jumps. In particular, the scanning path can define movement in at least one orthogonal dimension (e.g., x or y dimensions over a surface) as a sinusoidal pattern (e.g., sine or cosine). In an example, the sinusoidal pattern can be a function of time. For example, the sinusoidal pattern can include a periodicity parameter. Further, the sinusoidal pattern can have an amplitude, which may be constant or may be a function of time or position. In general, a first derivative of the sinusoidal pattern is also sinusoidal. For example, the sinusoidal pattern may be a sine or cosine pattern. In an example, when the sinusoidal pattern is a sine pattern, the first derivative is a cosine and the second derivative is a negative sine. The sinusoidal pattern and the sinusoidal derivatives are favorable for reducing acceleration jumps in the mirror movement and for enabling continuity at the end of the scanning path, such that scans can be run multiple times to increase the number of sampling points and therefore the accuracy of the analytical results.

Sample points can be defined along the sample path, for example, by the sinusoidal pattern. The sample points can be defined equidistant along the path. In an example, the equidistant sample points can be linearly equidistant points or curvilinearly equidistant points. The sinusoidal path and equidistant sample points along the path allow for desirable movement of the mirrors, such that the mirrors can move the beam to a next sample point quickly while remaining stationary at each sample point long enough for the laser to generate the desirable plasma.

Figure 6:
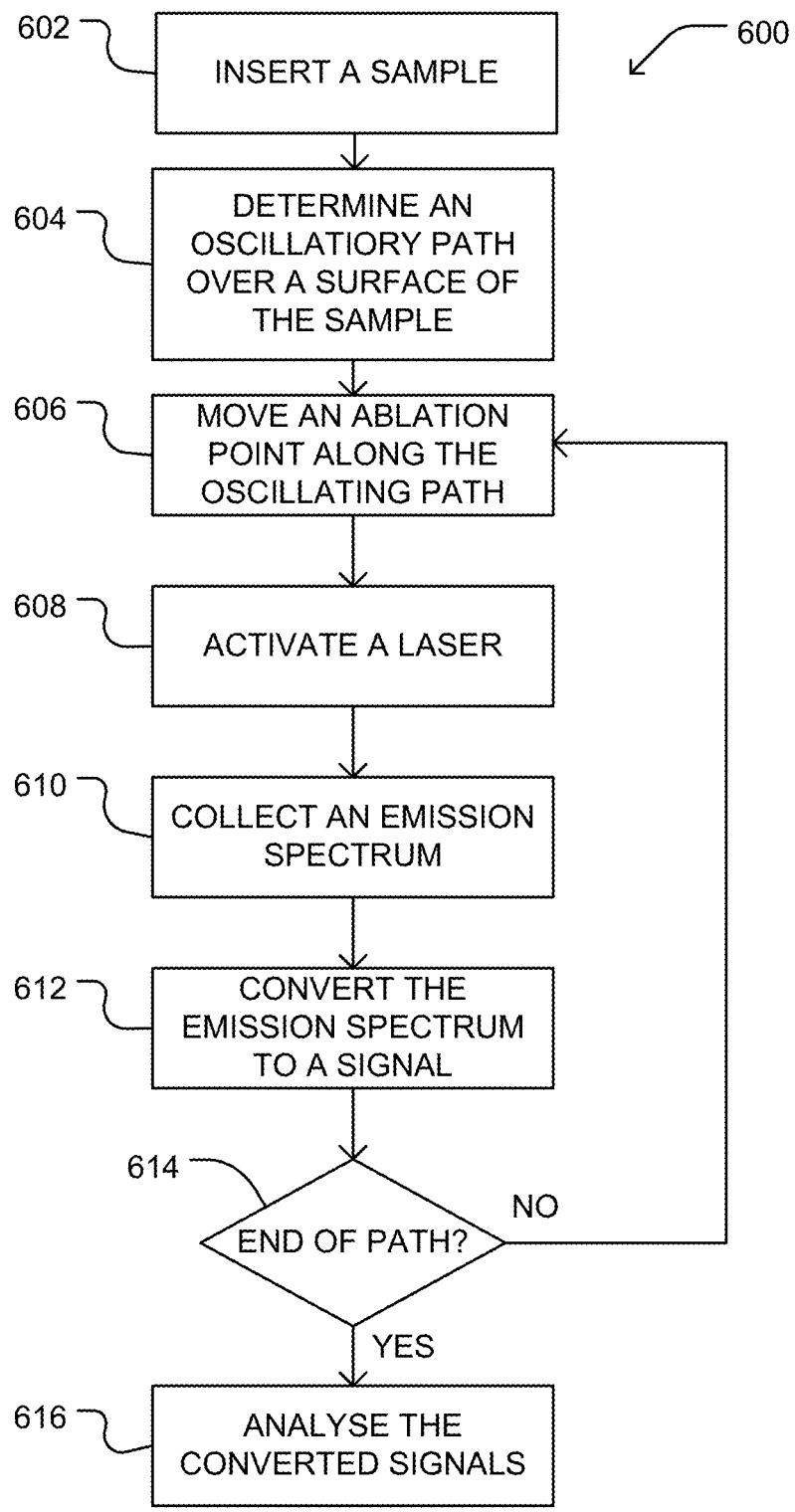
FIG. 6 and FIG. 7 include block flow diagrams illustrating example methods for performing laser-induced breakdown spectroscopy.

FIG. 6 includes a block flow diagram illustrating an example method 600 for analyzing a sample. The method 600 includes inserting a sample, as illustrated at block 602. For example, a sample can be inserted into a chamber or placed on a platform in a chamber. In another example, the sample can be placed against a sample table having an analysis aperture exposing a surface of the sample to an interior of a chamber.

As illustrated at block 604, the system can determine an oscillatory path defined over the surface of the sample. For example, an analysis aperture can define an area of a sample that is exposed for testing. The oscillatory path can utilize a sinusoidal pattern in at least one dimension over the area exposed on the surface of the sample. Alternatively, an irregular shape can be exposed on the surface or can be selected by a user of the instrument. The system can define an oscillatory path that provides a desirable distribution of sample points across the surface of the irregularly shaped test area. In an example, a controller of the system can utilize a camera, as shown in FIG. 1, to determine the shape of the surface and define an appropriate oscillatory path that provides a desirable distribution of sample points across the surface.

In an example, the oscillatory path is sinusoidal along at least one orthogonal dimension of two orthogonal dimensions along the surface of the sample. For example, the oscillatory path can have a sine or cosine pattern along at least one orthogonal dimension of the two orthogonal dimensions. For example, the oscillatory path can have a sine pattern along a height dimension. The sinusoidal pattern can be characterized by a periodicity parameter and an amplitude. The periodicity parameter can be specified to provide a number of oscillations across the surface in one orthogonal dimension. The amplitude may be constant. In another example, the amplitude can be a function of time. In a further example, the amplitude can be a function of position.

In a further example, both orthogonal dimensions are defined by sinusoidal patterns. In an example, the sinusoidal pattern in the first orthogonal dimension can be a sine pattern, while the sinusoidal pattern in a second orthogonal dimension is a cosine pattern. Each pattern can be defined by a periodicity parameter. The periodicity parameter for both patterns along the two orthogonal dimensions can be the same. In another example, the periodicity parameters are different. For example, the ratio of the two periodicity parameters can be an integer. In an example, the ratio is an even number integer. Alternatively, the ratio is an odd number integer. The amplitudes associated with the sinusoidal patterns of the two orthogonal dimensions can be the same. For example, the amplitudes can be the same function of time or the same constant. In another example, the amplitudes for each of the sinusoidal patterns of the two orthogonal dimensions is different. Further, the amplitude for a sinusoidal pattern of the second dimension can be a constant, while the amplitude associated with the sinusoidal pattern of the first orthogonal dimension can be a function of position.

In another example, the oscillatory path having at least one sinusoidal pattern defined along at least one of the orthogonal dimensions can include a non-sinusoidal pattern on the second orthogonal dimension. For example, the sinusoidal pattern in the y-dimension can be a sine pattern having a desired periodicity and amplitude, while the pattern in the x-dimension is linear, such as a linear function of time.

Further, sample points are defined along the oscillatory path. For example, equidistant sample points can be defined sequentially along the oscillatory path. The equidistant ablation points can be linearly equidistant or can be curvilinearly equidistant.

As illustrated at block 606, the ablation point of a laser can be directed to a next sample point along the oscillatory path. Redirection of the laser can be accomplished by moving mirrors to direct the ablation point of the laser to the new position. The inertial properties of the galvos may not allow the mirrors to completely stop their movement at each ablation point. Nevertheless, an advantage of using the oscillatory movement presented here is that the rotation of the galvo is kept constant to allow the mirrors to smoothly continue their course. As the laser pulse is several orders of magnitude faster than the galvo movements, each pulse impacts as if the mirrors are effectively fixed. This results in each ablation point being directed to the intended location on the sample and without any appreciable distortion of the ablation spot.

The laser is activated, for example, as illustrated at block 608. As a result of the activation of the laser, one or more pulses impinge the surface of the sample at the ablation point, causing plasma to form which emits a spectrum characteristic of the composition of the sample at that point along the surface.

As illustrated at block 610, the emission spectrum is collected. For example, the emission spectrum can be collected by a mirror that directs the collected emission spectrum to a spectrographic lens or a spectrograph. The spectrograph converts the emission spectrum to a signal, as illustrated at block 612.

As illustrated at block 614, the system can determine whether it has reached the last sample point along the oscillatory path. If the last sample point has not been reached, the system can repeat moving the ablation point along the oscillatory path to a next sample point, as illustrated at block 606, activate the laser, as illustrated at block 608, collect the emission spectrum as illustrated at block 610, and convert the emission spectrum to a signal, as illustrated at block 612.

Once the end of the oscillatory path is reached where the last sample point has been tested, the system can analyze the converted signals, as illustrated at block 616. For example, the system can analyze signals to determine composition at each point. Further, the system can average the measurements. In an example, the system can determine a mean, median, or mode of the measurements. For example, the system can determine a mean composition measurement across the tested sample points. While analysis is illustrated as occurring after the sampling process is complete, analysis can take place concurrently with the testing of sample points along the oscillatory path.

Figure 7:
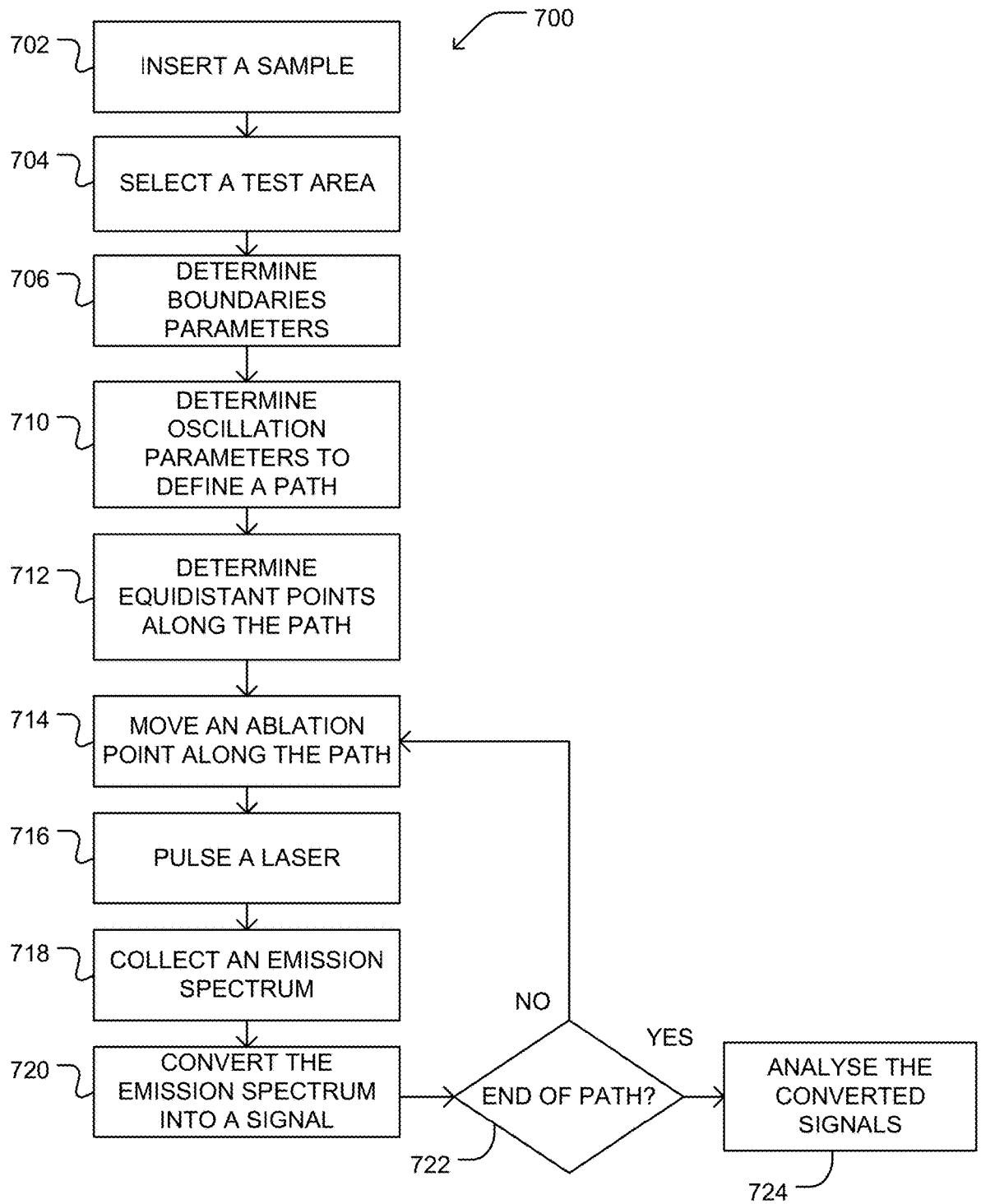

FIG. 7 includes a block flow diagram of a further method 700 for testing a sample. The method 700 is particular useful when testing a sample having a surface not defined by apertures or other regularly-shaped mechanical features associated with the apparatus. In particular, samples including irregular shaped test areas benefit from the method of FIG. 7.

In an example, the method 700 includes inserting a sample into the system, as illustrated at block 702. For example, inserting the sample can include placing the sample on a table, such as a translation table, or placing the sample above an aperture exposed to a chamber.

A test area is selected on the sample, as illustrated at block 704. For example, an image of the sample can be provided to a user to select the desired test area. In another example, the system can determine edges associated with the surface of the sample and select the test area based on the edges of the sample surface. In some examples, the test area can have a regular shape, such as a circle or a rectangle. In other examples, the selected test area can have an irregular shape.

As illustrated at block 706, the system can determine a center line and boundary parameters. For example, the system can determine a width of the test area at the center line and a distance to the boundary or edge from the center line.

Oscillatory parameters, for example, periodicity parameters or amplitudes, can be determined to define an oscillatory path, as illustrated block 710. For example, the periodicity parameters associated with sinusoidal patterns along one or both orthogonal dimensions along the surface can be defined. Further, amplitude parameters can be determined for one or both patterns along the two orthogonal dimensions.

As illustrated at block 712, the system can determine equidistant points along the oscillatory path. For example, the points can be linearly equidistant along the oscillatory path. In another example, the points can be curvilinearly equidistant along the oscillatory path.

The system can test each of the sample points defined along the oscillatory path. For example, the system can move an ablation point of the laser to a next sample point along the oscillatory path, as illustrated at block 714. The laser can be pulsed one or more times to generate a plasma, as illustrated at block 716.

An emission spectrum emitted by the plasma can be collected, as illustrated at block 718. The emission spectrum can then be converted into a signal, as illustrated at block 720, for example, by a spectrographic lens or spectrograph.

As illustrated at block 722, the system can determine whether it has reached the end of the sample points along the oscillatory path or whether to move to a subsequent sample point along the oscillatory path. Once it has reached the end of the oscillatory path, the system can analyze the converted signals, as illustrated at block 724. For example, the system can determine the composition at each of the points along the surface. Further, the system can determine an average composition. In an example, the system can determine a mean, median, or mode of the measurements. The system can average the measurement of the converted signals and determine compositions based on a sum of the signals. Alternatively, the system can determine a composition at each point and average the compositions across the sample points.

Such methods can be used to define patterns providing a desired distribution of sample points across a surface for a variety of shaped test areas. For example, the test area may be circular. In another example, the test area may be rectangular. In a further example, the test area may be irregular.

Figure 8:
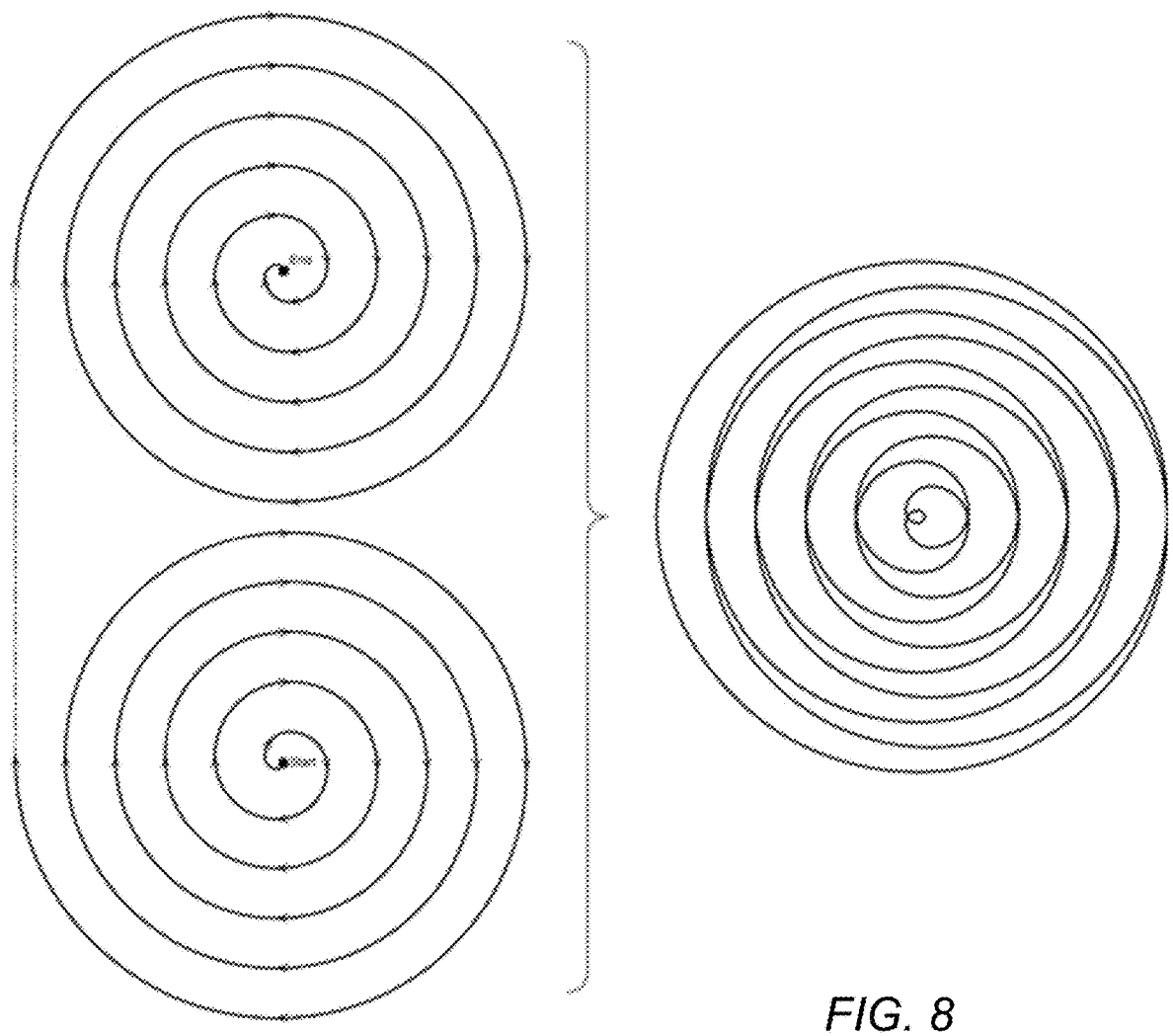
FIG. 8 and FIG. 9 include illustrations of example scanning patterns for use by laser-induced breakdown spectroscopy systems.

For example, FIG. 8 includes an illustration of an example oscillatory path that covers a circular test area. The path follows a spiral pattern. Such a pattern can be generated using sinusoidal patterns in both of the two orthogonal dimensions. In an example, the sinusoidal pattern in a first dimension of the two orthogonal dimensions is a sine pattern, while the sinusoidal pattern in the second orthogonal dimension is a cosine pattern. Each sinusoidal pattern is a function of time. Further, in the illustrated example, the periodicity parameter associated with each of the patterns is equal. The amplitude associated with each of the sinusoidal patterns is the same and is a function of time. For example, the pattern can be generated using the equation below (Eq. 1). As described, the amplitude increases with time (t) until a maximum value is reached at which time the amplitude decreases.

Figure 9:
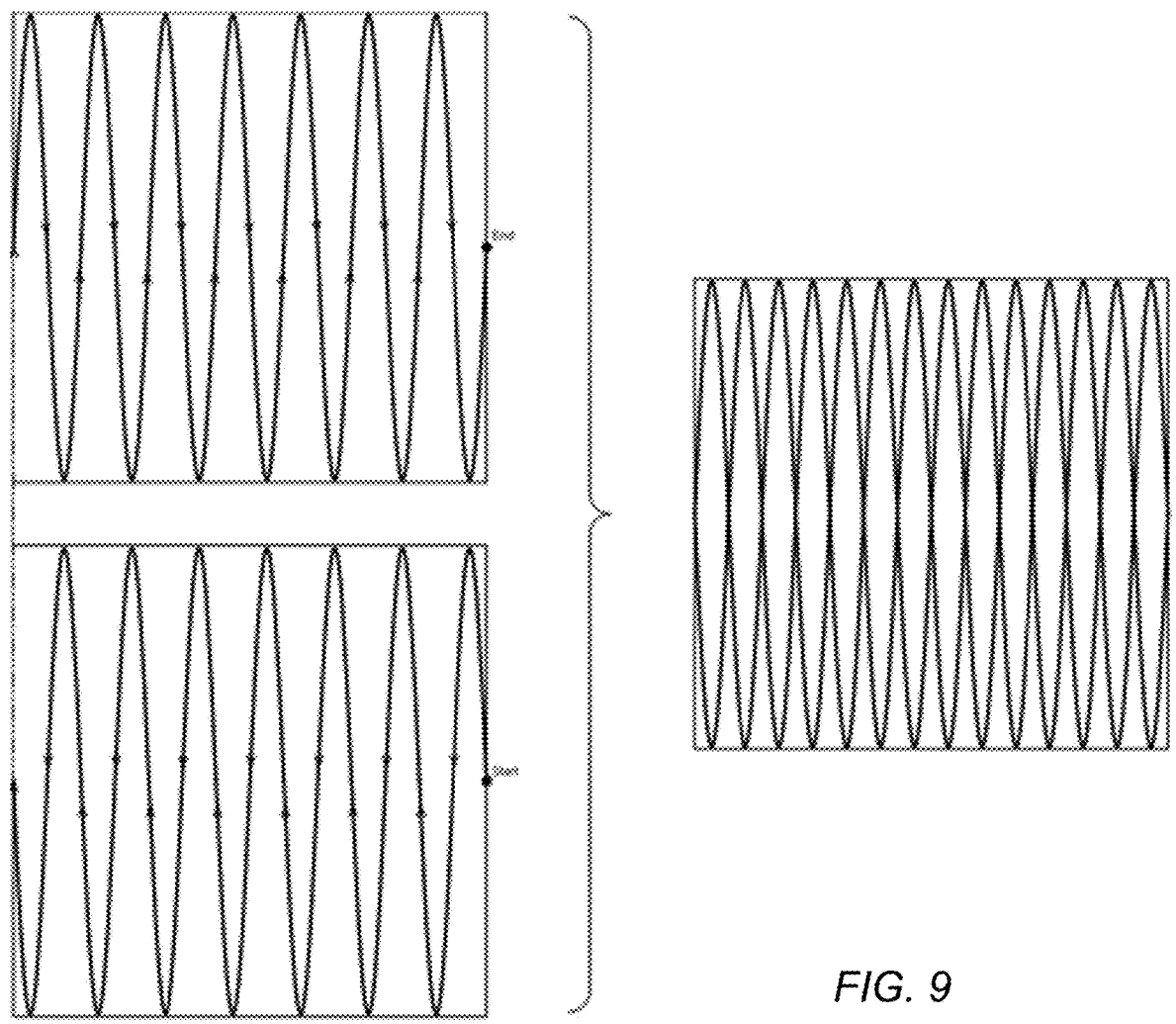

$x(t) = r(t) \cdot \cos(k \cdot t)$; and $y(t) = r(t) \cdot \sin(k \cdot t)$, wherein:

$r(t) = k_r \cdot t$ for $0 < t < t_{rmax}$ and $r(t) = r_{max} - k_r \cdot t$ for $t_{rmax} < t < t_{rzero}$ (Eq. 1)

where $t_{max}$ is the time at which the maximum radius (r(t)) is reached and $t_{rzero}$ is the time when the radius (r(t)) returns to zero. k and $k_r$ are constants. FIG. 9 illustrates a further example of an oscillatory path generated using the sinusoidal pattern in at least one dimension of the two orthogonal dimensions along a surface. For example, the oscillatory path can have a sinusoidal pattern in a y-dimension. The periodicity parameter can be defined to provide a number of oscillations across the surface. The amplitude, α, of the sinusoidal pattern is constant, and $k_y$ is a constant.

$y(t) = \alpha \cdot \sin(k_y \cdot t)$ (Eq. 2)

The second dimension, such as the x-dimension, can be defined using a linear pattern or using a sinusoidal pattern, such as a cosine pattern. In an example, the x-dimension is defined as a linear function that increases with time until an endpoint or full width is reached at which time the pattern reverses direction using the same rate constants ($k_x$).

$x(t) = k_x \cdot t$ for $0 < t < t_{xmax}$ and $x(t) = x_{max} - k_x \cdot t$ for $t_{xmax} < t < t_{xzero}$ (Eq. 3)

where $t_{xmax}$ is the time at which x(t) reaches a maximum width and $t_{xzero}$ is the time when x(t) returns to zero.

Alternatively, the second dimension can be defined using a sinusoidal pattern, such as a cosine pattern, having a different periodicity than the sine pattern of the first orthogonal dimension. In the illustrated example, the periodicity parameter of the sine pattern is 14 times that of the periodicity parameter of the cosine pattern of the second orthogonal dimension. Thus, the oscillatory path oscillates seven times between boundaries in the y-dimension for each oscillation across the width in the x-dimension.

$x(t) = \beta \cdot \cos(k_x \cdot t)$, wherein $\frac{k_y}{k_x} = i$ (e.g., $i = 14$) (Eq. 4)

where β is a constant, and $k_x$ is a constant.

While FIG. 8 and FIG. 9 illustrate oscillatory paths in which the amplitudes are constant or a function of time, the oscillatory path can alternatively be defined using patterns in which the amplitude for at least one dimension is a function of position.

Figure 10:
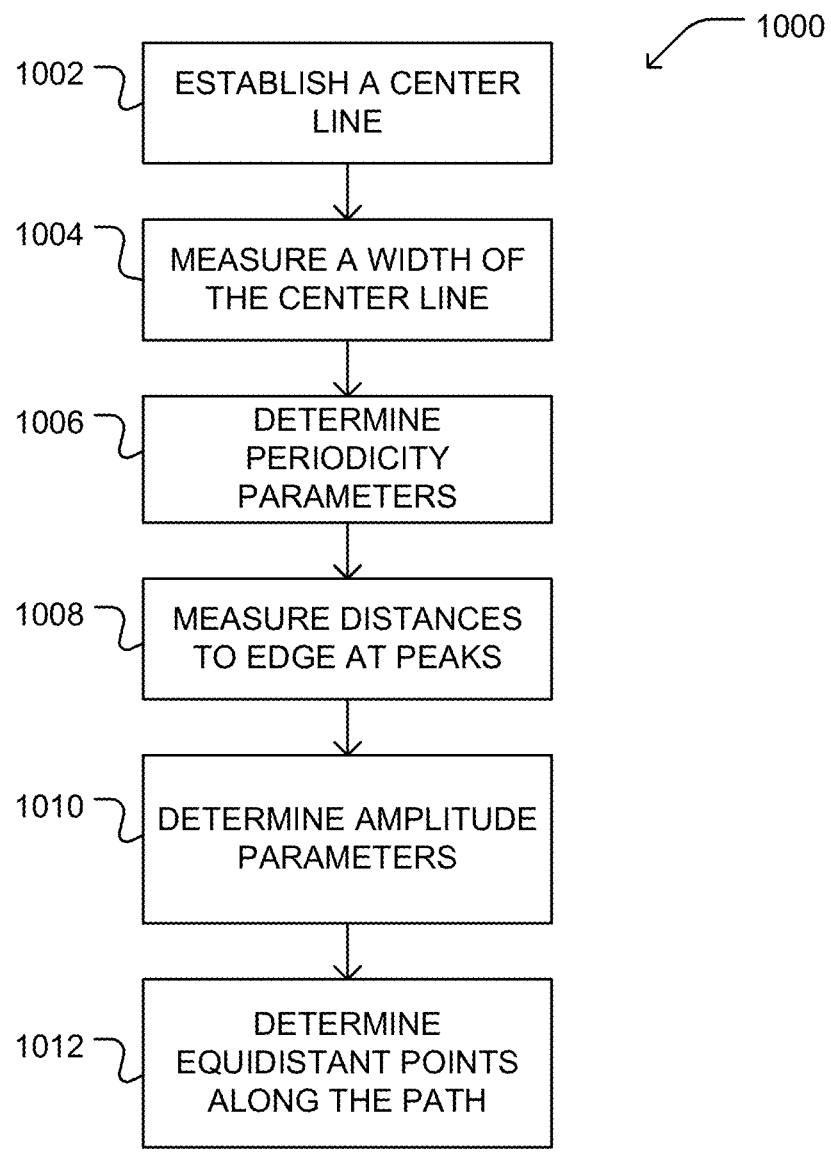
FIG. 10 includes a block flow diagram illustrating an example method for use by a laser-induced breakdown spectroscopy system.

FIG. 10 illustrates a block flow diagram illustrating a method 1000 for determining sinusoidal patterns having an amplitude as a function of position. For example, as illustrated at block 1002, when a test area is selected, the system can establish a center line. For example, the center line can be defined along one of the orthogonal dimensions, such as, for example, the x-dimension. In particular, the center line can be selected at the maximum width along the x-dimension.

As illustrated at block 1004, the system measures the width of the center line. Based on the width of the center line, the desired number of oscillations across the surface, and the desired number of sample points, the system can determine periodicity parameters for the sinusoidal pattern of one or both orthogonal dimensions, as illustrated at block 1006. In an example, a ratio of the periodicity parameters is an even number integer. Alternatively, the ratio of periodicity parameters is an odd number integer.

Once the periodicity parameters are determined, a position of each peak in the period of the sinusoidal pattern of at least one of the orthogonal dimensions is known. For example, if a sinusoidal function or pattern is assigned to a y-dimension, based on the linear pattern or sinusoidal pattern in the x-dimension, the x-dimension position of the peaks of the sinusoidal pattern in the y-dimension can be determined.

As illustrated at block 1008, a distance from the center line to an edge of the test area at the x-position of each of the peaks of the sinusoidal pattern in the y-dimension can be determined. At block 1010, the amplitude parameters of the sinusoidal pattern in the y-dimension can be determined based on the measured distances from the center line at each peak. For example, each time the sinusoidal pattern of the y-dimension passes across the center line, the system can assign a new amplitude parameter to the sinusoidal pattern in the y-dimension.

Once the oscillator path is determined, the system can determine equidistant points along the oscillatory path, as illustrated at block 1012. Such equidistant points can be sample points.

Figure 11:
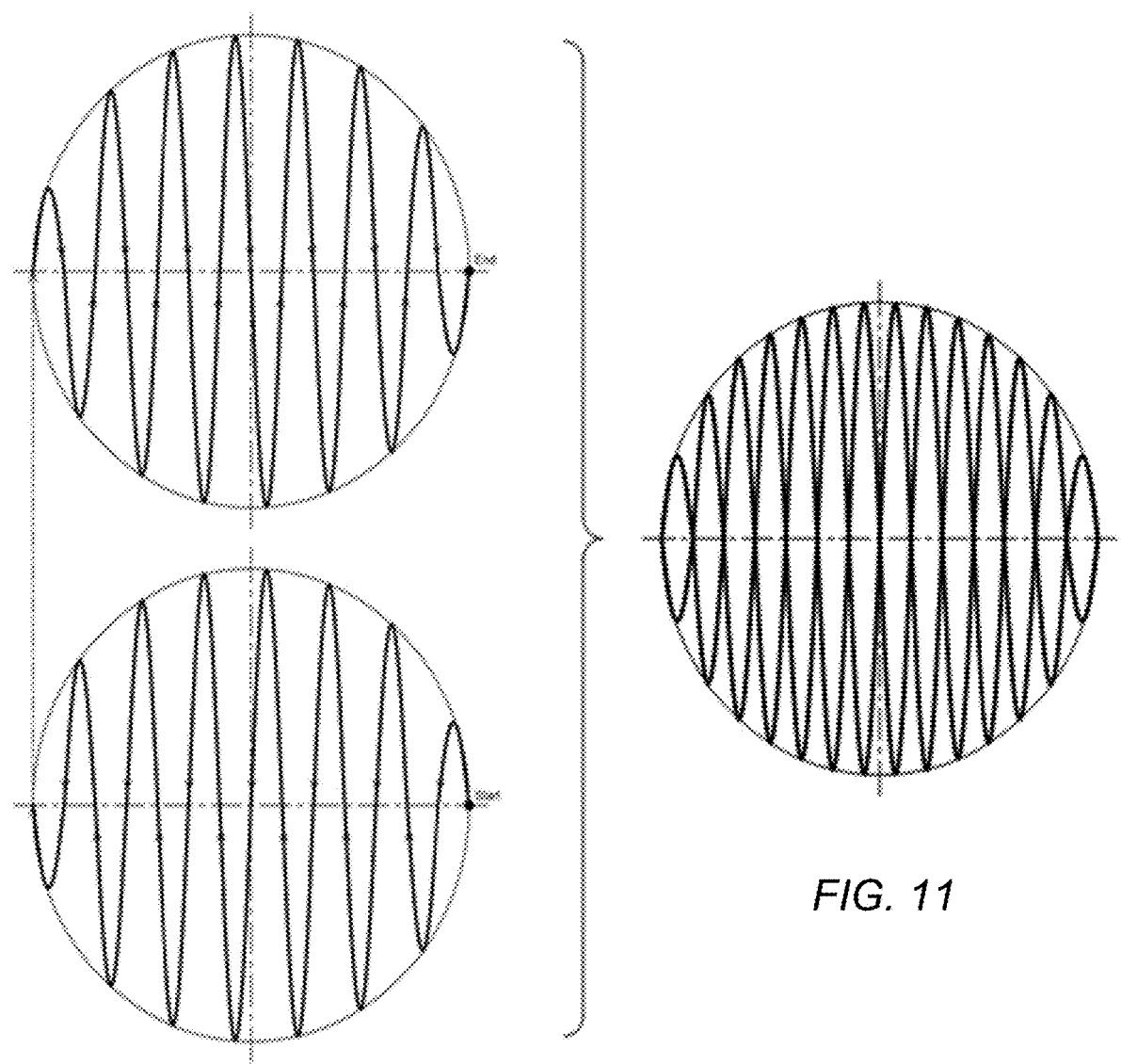
FIG. 11, FIG. 12, FIG. 13, and FIG. 14 include illustrations of example scanning patterns for use by laser-induced breakdown spectroscopy systems.
Figure 12:
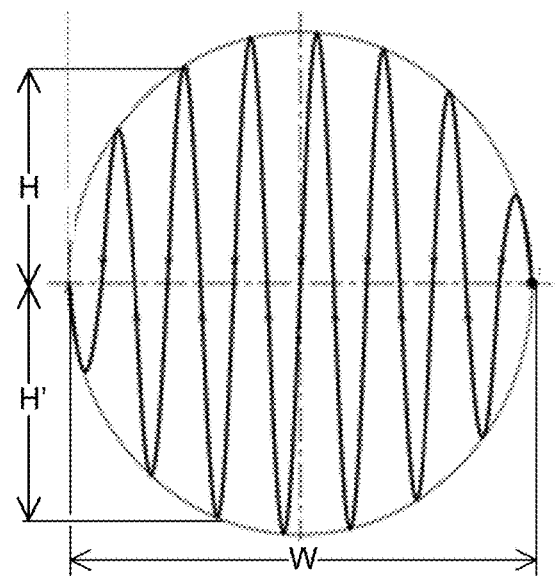

For example, FIG. 11 and FIG. 12 illustrate an example oscillatory path across a circular test area. In the illustrated example, the oscillatory path has a sinusoidal pattern, such as a sine pattern, in the y-dimension. In a further example, the pattern can include a sinusoidal pattern in the x-dimension, such as a cosine pattern. The periodicity parameter of the sinusoidal pattern in the y-dimension is 14 times that of the periodicity parameter of the sinusoidal pattern in the x-dimension. The amplitude of the cosine pattern in the x-dimension is constant. But the amplitude of the sine pattern in the y-dimension is a function of position. For example, each time the oscillatory path passes through the center line, the amplitude, a, of the sinusoidal function in the y-dimension can be altered based on a distance to the outer edge.

$$x(t) = \beta \cdot \cos(k_x \cdot t); \text{ and} \quad \text{(Eq. 5)}$$
$$y(t) = \alpha(x) \cdot \sin(k_y \cdot t),$$
$$\text{wherein } \frac{k_y}{k_x} = i \text{ (e.g., } i = 14\text{).}$$

where $k_x$, $k_y$, $\beta$ and are constants.

For example, as illustrated in FIG. 12, the system can determine a center line that has a width W in the x-dimension. The amplitude for the cosine pattern in the x-dimension can be selected such that the pattern traverses the entire width for each period. The periodicity of the sine pattern associated with the y-dimension can be selected such that the ratio of the periodicity of the sine pattern to the periodicity parameter of the cosine pattern is an integer, such as 14.

Based on the known cosine pattern extending in the x-dimension, the x-position of each of the peaks of the sine pattern in the y-dimension is known. The system can then determine a distance from the center line to an edge at the peaks of the sine pattern and determine the amplitude of the sine pattern based on the distance from the center line to an edge. For example, each time the sine pattern passes down through the center line, a distance to the edge can be determined and the amplitude of the sine pattern determined based on the distance H'. Similarly, when the sine pattern passes up through the center line, the distance H can be determined and the amplitude of the sine pattern determined based on the distance H.

Figure 13:
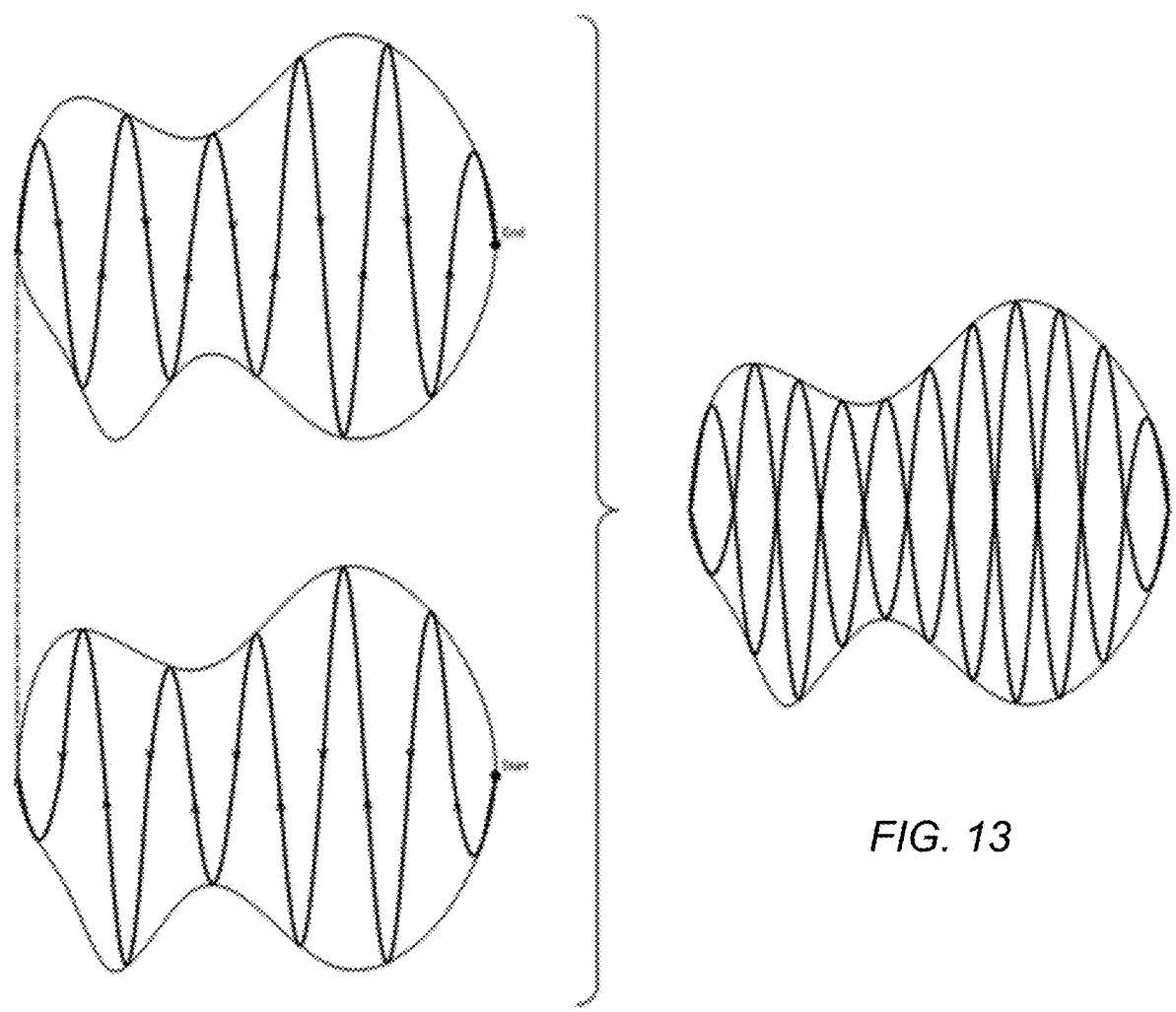
Figure 14:
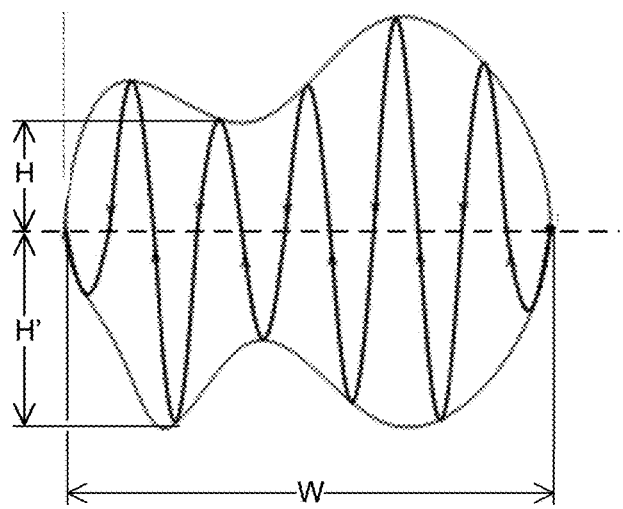

FIG. 13 and FIG. 14 include a further illustration, applying such a methodology to an irregular test area. A center line and a width of the center line W can be determined. Based on the determined center line, the pattern associated with the x-dimension can be determined. In an example, the pattern can be linear (e.g., Eq. 3). In another example, the pattern can be sinusoidal, such as a cosine pattern (e.g., Eq. 4).

Based on the desired number of oscillations across the surface during each period of the cosine pattern in the x-dimension, the periodicity parameter of the sinusoidal pattern in the y-dimension can be determined. In the illustrated example, the ratio of the periodicity parameter in the y-dimension relative to the periodicity parameter in the x-dimension is 11. The amplitude in the sinusoidal pattern in the y-dimension can be a function of position (e.g., Eq. 5). For example, for each peak, a distance from the center line H or H' can be determined. The amplitude can be set based on a crossing of the center line towards a given peak for the sinusoidal pattern in the y-dimension. As such, an irregular pattern can be traversed from edge to edge providing a distribution of samples.

Figure 15:
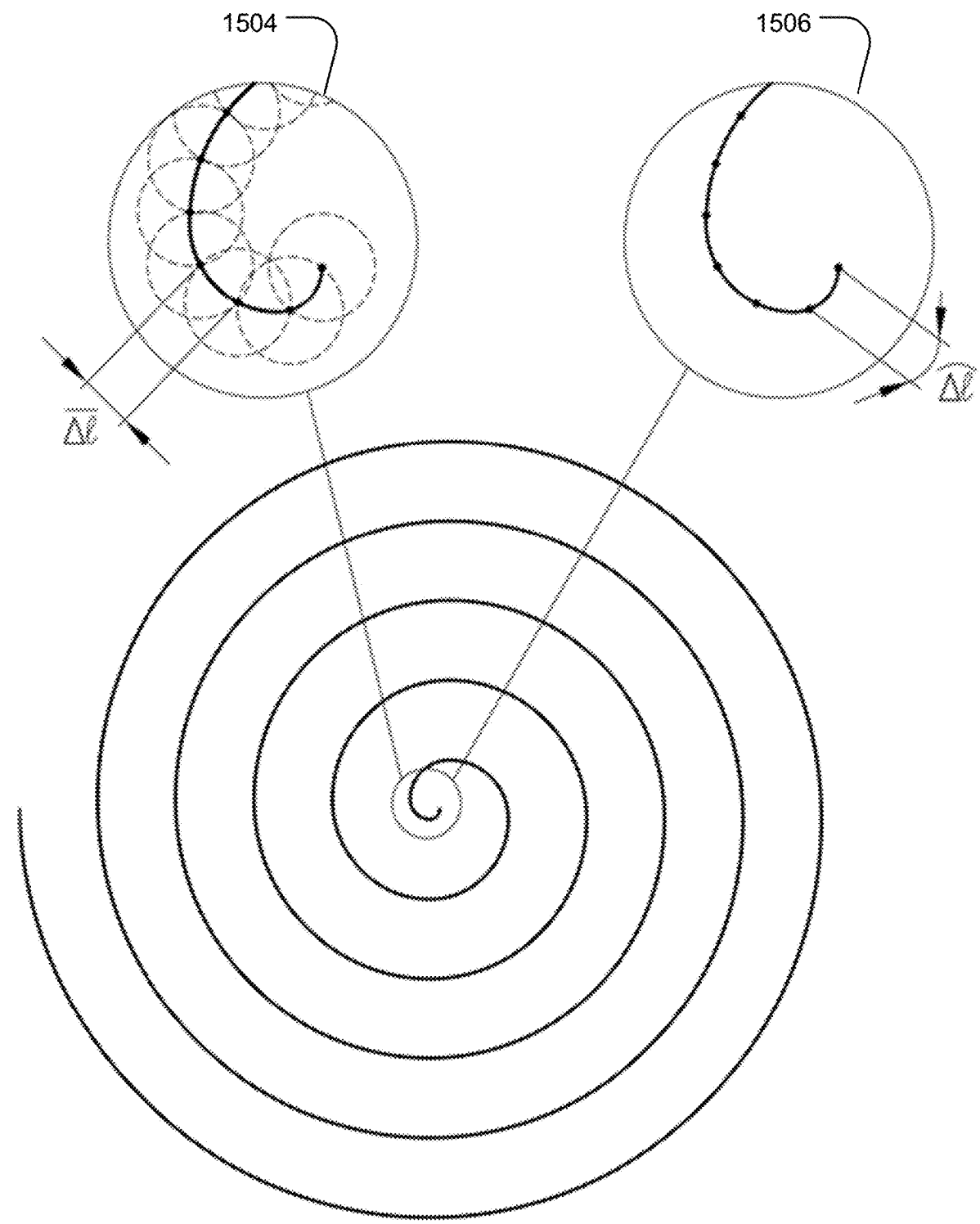
FIG. 15 includes an illustration of an example pattern of ablation points.

For each of the oscillatory paths, the system can determine equidistant sample points along that path to test using laser ablation of the surface. For example, as illustrated in FIG. 15, an oscillatory path can include equidistant sample points. The equidistant sample points can be determined based on the linear distance, as illustrated at 1504, (e.g., Eq. 6). Alternatively, the distance can be determined based on a curvilinear distance (e.g., Eq. 7) along the oscillatory path, as illustrated at 1506.

$$\overline{\Delta l} = \sqrt{[x(t_2) - x(t_1)]^2 + [y(t_2) - y(t_1)]^2} \quad \text{(Eq. 6)}$$

$$\widehat{\Delta l} = \int_{t_1}^{t_2} \sqrt{\left(\frac{d}{dt}x(t)\right)^2 + \left(\frac{d}{dt}y(t)\right)^2} \, dt \quad \text{(Eq. 7)}$$

Figure 16:
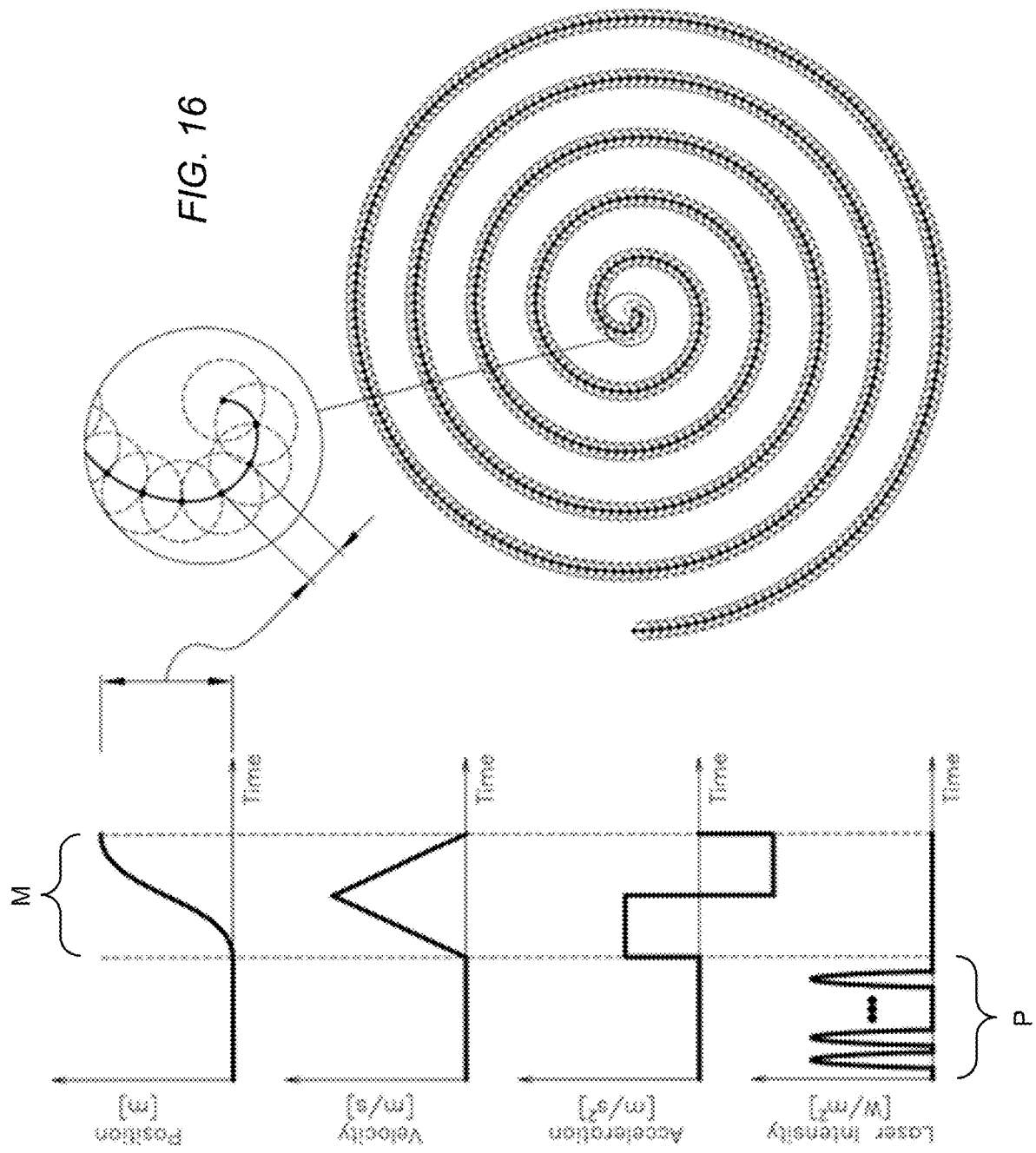
FIG. 16 and FIG. 17 include diagrams illustrating a pattern of movement to adjacent ablation points.

When laser pulses are being directed to the surface to generate a plasma, mirrors directing the laser can be stationary. When the laser is being redirected, the laser pulses can be halted. For example, as illustrated in FIG. 16, the laser is activated during a period (P) in which the position of the ablation point is stationary at a sample point along the oscillatory path. Once the pulses have ceased, the system can redirect the laser, moving the ablation point during a period (M). The movement during the period (M) when viewed as position versus time can have an s-shape. A first derivative of the s-shaped movement provides a velocity having a triangular shape, and the second derivative provides an acceleration depicted as a square wave. Thus, the oscillatory path with equidistant sample points disposed along the path provides for quick movement between positions and periods in which the system is stationary for testing a point along the oscillatory path.

Figure 17:
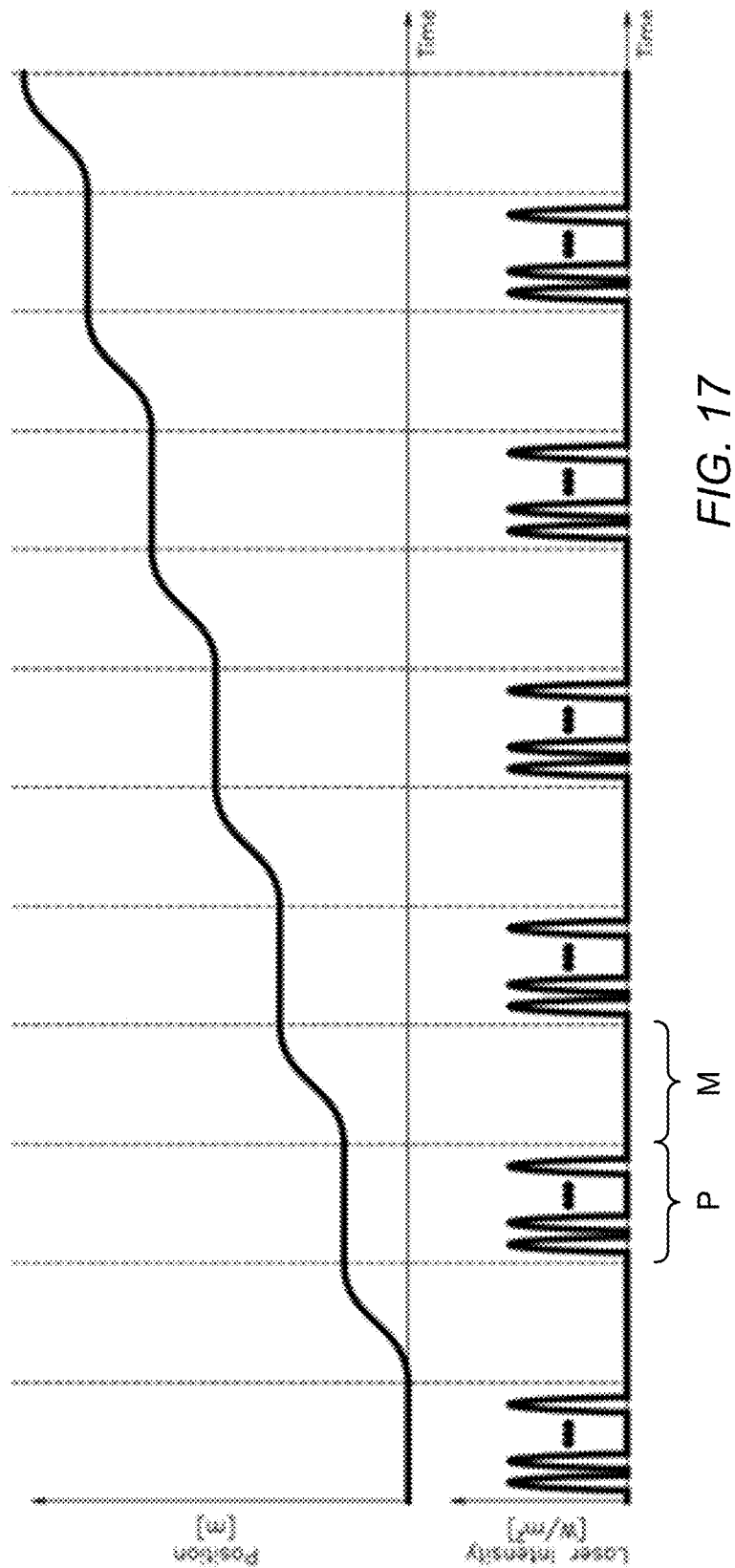

For example, as illustrated in FIG. 17, periods (P), in which one or more pulses are directed at a sample surface, are followed by quick movements during period (M) to redirect the ablation point of the laser to the next sample point. Thus, based on the positioning of points along the path, kinematics between each point can be defined in which in one period, the mirrors are stationary during a lapse of time long enough to allow the laser to generate multiple pulses on the same spot on the sample surface. Such a lapse of time is generally on the order of milliseconds. Such stationary positioning provides a stable and reproducible plasma, improving analytical performance. During the second portion or period of the kinematic movement, the ablation point is moved to the next sample point using an s-profile (displacement as a function of time). Such a profile provides a desired speed between points and an acceleration profile that ensures smooth mirror dynamics. By utilizing both the sinusoidal pattern having equidistant sample points and the kinematics having an s-profile, a system having low scanning error and desirable analytical performance is provided. Moreover, the analysis can be repeated at a desirable rate on the order of kilohertz or more.

In a first embodiment, a method for compositional analysis includes providing a sample having a surface and determining with a controller a plurality of equidistant positions along an oscillatory path along the surface. The oscillatory path is sinusoid in at least one orthogonal dimension within a plane approximately parallel to the surface. For each equidistant position of the plurality of equidistant positions, the method includes moving an ablation point along the oscillatory path to the each equidistant position, pulsing an energy source to provide an electromagnetic energy beam to ablate material at the ablation point, and collecting an emission spectrum with a spectrographic instrument in response to pulsing the energy source. The method further includes analyzing the emission spectrum to determine a composition at the surface.

In an example of the first embodiment, moving the ablation point includes moving the sample using a translation plate.

In another example of the first embodiment and the above examples, moving the ablation point includes positioning mirrors.

In a further example of the first embodiment and the above examples, the plurality of equidistant positions are linearly equidistant along the oscillatory path.

In an additional example of the first embodiment and the above examples, the plurality of equidistant positions are curvilinearly equidistant along the oscillatory path.

In another example of the first embodiment and the above examples, in another orthogonal dimension within the plane, the oscillatory path varies in proportion to time.

In a further example of the first embodiment and the above examples, in another orthogonal dimension within the plane, the oscillatory path is sinusoidal. For example, the oscillatory path is continuously differentiable. In another example, in the at least one orthogonal dimension within the plane, the oscillatory path varies as one of a sine or cosine function of time and, in the another orthogonal dimension within the plane, the oscillatory path varies as the other of the sine or cosine function of time. In a further example, in the at least one orthogonal dimension within the plane, the oscillatory path varies with a first periodicity and, in the another orthogonal dimension within the plane, the oscillatory path varies with a second periodicity, wherein the first periodicity is an integer multiple of the second periodicity. For example, the integer multiple is in a range of 1 to 100, such as in a range of 2 to 20. In an additional example, the integer multiple is 1 and an amplitude of the oscillatory path in both the at least one dimension and the another dimension is proportional to time. In another example, an amplitude of the oscillatory path in the at least one dimension is a function of position in the another orthogonal dimension.

In an additional example of the first embodiment and the above examples, analyzing the emission spectrum includes averaging the composition for each equidistant position of the plurality of equidistant positions.

In another example of the first embodiment and the above examples, the method further includes selecting a test area on the surface of the sample, the oscillatory path being within the test area. For example, the method further includes determining a center line of the test area and determining a width of the center line, the center line extending in another orthogonal dimensions within the plane. In an example, the method further includes, with the controller, determining a distance in the at least one orthogonal dimension from the center line to an edge of the test area at a peak of a sinusoidal oscillation, and adjusting an amplitude of the sinusoidal oscillation based on the distance.

In a second embodiment, a system for laser-induced breakdown spectroscopy includes a table to receive a sample, a laser source to provide a laser beam, and a mirror system to direct the laser beam to a surface of the sample. The laser beam is to ablate a portion of the sample at an ablation point and to initiate a plasma that emits an emission spectrum. The system further includes a spectrographic instrument to receive the spectrum and a controller in communication with the mirror system. The controller is to determine a plurality of equidistant positions along an oscillatory path along the surface. The oscillatory path is sinusoid in at least one orthogonal dimension within a plane approximately parallel to the surface. The controller is to control the mirror system to move the ablation point along the oscillatory path to each equidistant position.

In an example of the second embodiment, the controller is in communication with the laser source, the controller to direct the laser to pulse the laser beam.

In another example of the second embodiment and the above examples, the controller is in communication with the spectrograph, the controller to direct the spectrograph to collect the emission spectrum. For example, the controller is to analyze the emission spectrum to determine a composition at the surface.

In a further example of the second embodiment and the above examples, the system further includes a beam expander in the path of the laser beam prior to the mirror system.

In an additional example of the second embodiment and the above examples, the system further includes an F-theta lens in the path of the laser beam following the mirror system.

In another example of the second embodiment and the above examples, the plurality of equidistant positions are linearly equidistant along the oscillatory path.

In a further example of the second embodiment and the above examples, the plurality of equidistant positions are curvilinearly equidistant along the oscillatory path.

In an additional example of the second embodiment and the above examples, in another orthogonal dimension within the plane, the oscillatory path varies in proportion to time.

In another example of the second embodiment and the above examples, in another orthogonal dimension within the plane, the oscillatory path is sinusoidal. For example, the oscillatory path is continuously differentiable. In another example, in the at least one orthogonal dimension within the plane, the oscillatory path varies as one of a sine or cosine function of time and, in the another orthogonal dimension within the plane, the oscillatory path varies as the other of the sine or cosine function of time. In a further example, in the at least one orthogonal dimension within the plane, the oscillatory path varies with a first periodicity and, in the another orthogonal dimension within the plane, varies with a second periodicity, wherein the first periodicity is an integer multiple of the second periodicity. For example, the integer multiple is in a range of 1 to 100, such as in a range of 2 to 20. In an example, the integer multiple is 1 and an amplitude of the oscillatory path in both the at least one dimension and the another dimension is proportional to time. In an additional example, an amplitude of the oscillatory path in the at least one dimension is a function of position in the another orthogonal dimension.

In a further example of the second embodiment and the above examples, the controller is to analyze the emission spectrum by averaging the composition for each equidistant position of the plurality of equidistant positions.

In an additional example of the second embodiment and the above examples, the controller is to select a test area on the surface of the sample, the oscillatory path being within the test area. For example, the controller is to determine a center line of the test area and to determine a width of the center line, the center line extending in another orthogonal dimensions within the plane. In an example, the controller is to determine a distance in the at least one orthogonal dimension from the center line to an edge of the test area at a peak of a sinusoidal oscillation and to adjust an amplitude of the sinusoidal oscillation based on the distance.

In a third embodiment, a method for compositional analysis includes providing a sample having a surface and determining with a controller a plurality of positions along an oscillatory path along the surface. The oscillatory path is sinusoid in two orthogonal dimensions within a plane approximately parallel to the surface. The oscillatory path varies with time in the two orthogonal dimensions. For each position of the plurality of positions, the method includes moving an ablation point along the oscillatory path to the each position, pulsing an energy source to provide an electromagnetic energy beam to ablate material at the ablation point, and collecting an emission spectrum with a spectrographic instrument in response to pulsing the energy source. The method further includes analyzing the emission spectrum to determine a composition at the surface.

In an example of the third embodiment, the plurality of positions are a plurality of equidistant positions disposed sequentially along the oscillatory path.

In another example of the third embodiment and the above examples, the plurality of equidistant positions are linearly equidistant along the oscillatory path.

In a further example of the third embodiment and the above examples, the plurality of equidistant positions are curvilinearly equidistant along the oscillatory path.

In an additional example of the third embodiment and the above examples, the oscillatory path is continuously differentiable.

In another example of the third embodiment and the above examples, in one orthogonal dimension of the two orthogonal dimensions within the plane, the oscillatory path varies as one of a sine or cosine function of time and, in another orthogonal dimension of the two orthogonal dimensions within the plane, the oscillatory path varies as the other of the sine or cosine function of time.

In a further example of the third embodiment and the above examples, in one orthogonal dimension of the two orthogonal dimensions within the plane, the oscillatory path varies with a first periodicity and, in another orthogonal dimension of the two orthogonal dimensions within the plane, the oscillatory path varies with a second periodicity, wherein the first periodicity is an integer multiple of the second periodicity. For example, the integer multiple is in a range of 1 to 100, such as a range of 2 to 20. In an additional example, the integer multiple is 1 and an amplitude of the oscillatory path in both the at least one dimension and the another dimension is proportional to time. In a further example, an amplitude of the oscillatory path in the at least one dimension is a function of position in the another orthogonal dimension.

In an additional example of the third embodiment and the above examples, analyzing the emission spectrum includes averaging the composition for each equidistant position of the plurality of equidistant positions.

In another example of the third embodiment and the above examples, the method includes selecting a test area on the surface of the sample, the oscillatory path being within the test area. For example, the method further includes determining a center line of the test area and determining a width of the center line, the center line extending in another orthogonal dimensions within the plane. In an example, the method further includes, with the controller, determining a distance in the at least one orthogonal dimension from the center line to an edge of the test area at a peak of a sinusoidal oscillation and adjusting an amplitude of the sinusoidal oscillation based on the distance.

In a fourth embodiment, a system for laser-induced breakdown spectroscopy includes a table to receive a sample, a laser source to provide a laser beam, and a mirror system to direct the laser beam to a surface of the sample. The laser beam is to ablate a portion of the sample at an ablation point and is to initiate a plasma that emits an emission spectrum. The system further includes a spectrographic instrument to receive the spectrum and a controller in communication with the mirror system. The controller is to determine a plurality of positions along an oscillatory path along the surface. The oscillatory path is sinusoid in two orthogonal dimensions within a plane approximately parallel to the surface. The oscillatory path varies with time in the two orthogonal dimensions. The controller is to control the mirror system to move the ablation point along the oscillatory path to each position.

In an example of the fourth embodiment, the controller is in communication with the laser source, the controller to direct the laser to pulse the laser beam.

In another example of the fourth embodiment and the above examples, the controller is in communication with the spectrograph, the controller to direct the spectrograph to collect the emission spectrum. For example, the controller is to analyze the emission spectrum to determine a composition at the surface.

In a further example of the fourth embodiment and the above examples, the system further includes a beam expander in the path of the laser beam prior to the mirror system.

In an additional example of the fourth embodiment and the above examples, the system further includes an F-theta lens in the path of the laser beam following the mirror system.

In another example of the fourth embodiment and the above examples, the plurality of positions are a plurality of equidistant positions disposed sequentially along the oscillatory path. For example, the plurality of equidistant positions are linearly equidistant along the oscillatory path. In another example, the plurality of equidistant positions are curvilinearly equidistant along the oscillatory path.

In a further example of the fourth embodiment and the above examples, the oscillatory path is continuously differentiable.

In an additional example of the fourth embodiment and the above examples, in one orthogonal dimension of the two orthogonal dimensions within the plane, the oscillatory path varies as one of a sine or cosine function of time and, in another orthogonal dimension of the two orthogonal dimensions within the plane, the oscillatory path varies as the other of the sine or cosine function of time.

In another example of the fourth embodiment and the above examples, in one orthogonal dimension of the two orthogonal dimensions within the plane, the oscillatory path varies with a first periodicity and, in another orthogonal dimension of the two orthogonal dimensions within the plane, the oscillatory path varies with a second periodicity, wherein the first periodicity is an integer multiple of the second periodicity. For example, the integer multiple is in a range of 1 to 100, such as a range of 2 to 20. In another example, the integer multiple is 1 and an amplitude of the oscillatory path in both the at least one dimension and the another dimension is proportional to time. In a further example, an amplitude of the oscillatory path in the at least one dimension is a function of position in the another orthogonal dimension.

In a further example of the fourth embodiment and the above examples, the controller is to analyze the emission spectrum by averaging the composition for each equidistant position of the plurality of equidistant positions.

In an additional example of the fourth embodiment and the above examples, the controller is to select a test area on the surface of the sample, the oscillatory path being within the test area. For example, the controller is to determine a center line of the test area and to determine a width of the center line, the center line extending in another orthogonal dimensions within the plane. In an example, the controller is to determine a distance in the at least one orthogonal dimension from the center line to an edge of the test area at a peak of a sinusoidal oscillation and to adjust an amplitude of the sinusoidal oscillation based on the distance.

Note that not all of the activities described above in the general description or the examples are required, that a portion of a specific activity may not be required, and that one or more further activities may be performed in addition to those described. Still further, the order in which activities are listed are not necessarily the order in which they are performed.

In the foregoing specification, the concepts have been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" are employed to describe elements and components described herein. This is done merely for convenience and to give a general sense of the scope of the invention. This description should be read to include one or at least one and the singular also includes the plural unless it is obvious that it is meant otherwise.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

After reading the specification, skilled artisans will appreciate that certain features are, for clarity, described herein in the context of separate embodiments, may also be provided in combination in a single embodiment. Conversely, various features that are, for brevity, described in the context of a single embodiment, may also be provided separately or in any subcombination. Further, references to values stated in ranges include each and every value within that range.

What is claimed is:

1. A method for compositional analysis, the method comprising:
   providing a sample having a surface;
   determining with a controller a plurality of equidistant positions along an oscillatory path along the surface, the oscillatory path being sinusoid in at least one orthogonal dimension within a plane approximately parallel to the surface, wherein an amplitude of the oscillatory path in the at least one orthogonal dimension is a function of position in another orthogonal dimension;
   for each equidistant position of the plurality of equidistant positions:
      moving an ablation point along the oscillatory path to each of the plurality of equidistant position;
      pulsing an energy source to provide an electromagnetic energy beam to ablate material at the ablation point; and
      collecting an emission spectrum with a spectrographic instrument in response to pulsing the energy source; and
   analyzing the emission spectrum to determine a composition at the surface.

2. The method of claim 1, wherein moving the ablation point includes moving the sample using a translation plate.

3. The method of claim 1, wherein moving the ablation point includes positioning mirrors.

4. The method of claim 1, wherein the plurality of equidistant positions are linearly equidistant along the oscillatory path.

5. The method of claim 1, wherein the plurality of equidistant positions are curvilinearly equidistant along the oscillatory path.

6. The method of claim 1, wherein, in the another orthogonal dimension within the plane, the oscillatory path varies in proportion to time.

7. The method of claim 1, wherein, in the another orthogonal dimension within the plane, the oscillatory path is sinusoidal.

8. The method of claim 1, wherein the oscillatory path is continuously differentiable.

9. The method of claim 1, wherein, in the at least one orthogonal dimension within the plane, the oscillatory path varies as one of a sine or cosine function of time and, in the another orthogonal dimension within the plane, the oscillatory path varies as the other of the sine or cosine function of time.

10. The method of claim 7, wherein, in the at least one orthogonal dimension within the plane, the oscillatory path varies with a first periodicity and, in the another orthogonal dimension within the plane, the oscillatory path varies with a second periodicity, wherein the first periodicity is an integer multiple of the second periodicity.

11. The method of claim 10, wherein the integer multiple is in a range of 1 to 100.

12. The method of claim 11, wherein the integer multiple is in a range of 2 to 20.

13. The method of claim 1, wherein analyzing the emission spectrum includes averaging the composition for each equidistant position of the plurality of equidistant positions.

14. The method of claim 1, further comprising selecting a test area on the surface of the sample, the oscillatory path being within the test area.

15. The method of claim 14, further comprising determining a center line of the test area and determining a width of the center line, the center line extending in the another orthogonal dimensions within the plane.

16. The method of claim 15, further comprising, with the controller:
   determining a distance in the at least one orthogonal dimension from the center line to an edge of the test area at a peak of a sinusoidal oscillation; and
   adjusting an amplitude of the sinusoidal oscillation based on the distance.

17. A system for laser-induced breakdown spectroscopy comprising:
   a table to receive a sample;
   a laser source to provide a laser beam;
   a mirror system to direct the laser beam to a surface of the sample, the laser beam to ablate a portion of the sample at an ablation point and to initiate a plasma that emits an emission spectrum;

a spectrographic instrument to receive the spectrum; and a controller in communication with the mirror system, the controller to determine a plurality of equidistant positions along an oscillatory path along the surface, the oscillatory path being sinusoid in at least one orthogonal dimension within a plane approximately parallel to the surface, wherein an amplitude of the oscillatory path in the at least one orthogonal dimension is a function of position in another orthogonal dimension, the controller to control the mirror system to move the ablation point along the oscillatory path to each equidistant position.

18. The system of claim 17, wherein the controller is in communication with the laser source, the controller to direct the laser to pulse the laser beam.

19. The method of claim 1, wherein, in the at least one orthogonal dimension within the plane, the oscillatory path varies with a first periodicity and, in the another orthogonal dimension within the plane, the oscillatory path varies with a second periodicity, wherein the first periodicity is different from the second periodicity.

20. The system of claim 17, wherein, in the at least one orthogonal dimension within the plane, the oscillatory path varies with a first periodicity and, in the another orthogonal dimension within the plane, the oscillatory path varies with a second periodicity, wherein the first periodicity is different from the second periodicity.

* * * * *